US012127516B2

(12) United States Patent
Coffin et al.

(10) Patent No.: US 12,127,516 B2
(45) Date of Patent: *Oct. 29, 2024

(54) PRODUCTION FACILITY LAYOUT FOR AUTOMATED CONTROLLED ENVIRONMENT AGRICULTURE

(71) Applicant: MJNN LLC, South San Francisco, CA (US)

(72) Inventors: Gage Goodspeed Coffin, Los Altos Hills, CA (US); Michael Peter Flynn, Palo Alto, CA (US); Brice Leon Klein, San Francisco, CA (US); Alexandre Le Roux, Redwood City, CA (US); Nathaniel R. Storey, Laramie, WY (US); Tamara Tahir Hasoon, Redwood City, CA (US); Merritt Jonathan Jenkins, San Francisco, CA (US); Maria Alexandria Malone, San Francisco, CA (US); Matthew James Matera, San Francisco, CA (US); Kelly Catherine Casie LaBuff, San Francisco, CA (US); Alan Colbrie Schoen, Los Gatos, CA (US)

(73) Assignee: MJNN LLC, South San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/324,964

(22) Filed: May 27, 2023

(65) Prior Publication Data
US 2023/0389494 A1     Dec. 7, 2023

Related U.S. Application Data

(63) Continuation of application No. 17/281,694, filed as application No. PCT/US2019/058770 on Oct. 30, 2019, now Pat. No. 11,700,804.
(Continued)

(51) Int. Cl.
*A01G 31/04*     (2006.01)
*A01G 31/06*     (2006.01)

(52) U.S. Cl.
CPC ........... *A01G 31/045* (2013.01); *A01G 31/06* (2013.01)

(58) Field of Classification Search
CPC ............................ A01G 31/045; A01G 31/06
See application file for complete search history.

(56) References Cited

U.S. PATENT DOCUMENTS 2,244,677 A    6/1941  Cornell
3,254,448 A    6/1966  Othmar
(Continued)

FOREIGN PATENT DOCUMENTS

EP      0610137 A1    8/1994
JP      H0614663 A    1/1994
(Continued)

OTHER PUBLICATIONS

International Application No. PCT/US2019/023201, Search Report mailed Oct. 4, 2019, 6 pgs.
(Continued)

*Primary Examiner* — Joshua D Huson
*Assistant Examiner* — Katherine Anne Kloecker
(74) *Attorney, Agent, or Firm* — Almanac IP Advisors LLP

(57) ABSTRACT

Facility layouts and configurations for an automated crop production system for controlled environment agriculture. In particular implementations the core of the facility comprises a controlled growth environment and a central processing system. The controlled growth environment includes systems for exposing crops housed in modules, such as grow towers, to Controlled environmental conditions. The central processing system may include various stations and func-
(Continued)

tionality both for preparing crop-bearing modules to be inserted in the controlled growth environment, for harvesting crops from the crop-bearing modules after they have been extracted from the controlled growth environment, and for cleaning or washing crop-hearing modules for re-use. The remaining aspects of the crop production facility—such as seeding stations, propagation facilities, packaging stations and storage facilities—are arranged to achieve one or more desired efficiencies relating to capital expenditures or operating costs associated with an automated crop production facility.

20 Claims, 24 Drawing Sheets

Related U.S. Application Data

(60) Provisional application No. 62/752,980, filed on Oct. 30, 2018.

(56) References Cited

U.S. PATENT DOCUMENTS

| | | |
|---|---|---|
| 4,075,785 A | 2/1978 | Jones |
| 4,454,684 A | 6/1984 | O'Hare |
| 4,965,962 A | 10/1990 | Akagi |
| 5,502,923 A | 4/1996 | Bradshaw |
| 5,555,676 A | 9/1996 | Lund |
| 5,617,673 A | 4/1997 | Takashima |
| 5,862,628 A | 1/1999 | Takashima |
| 6,061,957 A | 5/2000 | Takashima |
| 7,049,743 B2 | 5/2006 | Uchiyama |
| 7,243,460 B2 | 7/2007 | Darlington |
| 7,415,796 B2 | 8/2008 | Brusatore |
| 7,533,493 B2 | 5/2009 | Brusatore |
| 7,536,827 B2 | 5/2009 | Busch et al. |
| 7,559,173 B2 | 7/2009 | Brusatore |
| 7,785,207 B2 | 8/2010 | Henry et al. |
| 7,921,601 B2 | 4/2011 | Henry et al. |
| 8,074,398 B2 | 12/2011 | Hazan |
| 8,122,642 B1 | 2/2012 | Huberman et al. |
| 8,141,294 B2 | 3/2012 | Bribach et al. |
| 8,151,518 B2 | 4/2012 | Adams et al. |
| 8,234,813 B2 | 8/2012 | Busch et al. |
| 8,250,808 B2 | 8/2012 | Kania et al. |
| 8,250,809 B2 | 8/2012 | Simmons |
| 8,327,579 B2 | 12/2012 | Kania et al. |
| 8,327,582 B2 | 12/2012 | Storey |
| 8,627,598 B1 | 1/2014 | Souder et al. |
| 8,689,485 B2 | 4/2014 | Friedman |
| 8,756,862 B1 | 6/2014 | Huberman et al. |
| 9,043,962 B2 | 6/2015 | Trofe |
| 9,282,699 B2 | 3/2016 | Anderson et al. |
| 9,357,715 B2 | 6/2016 | Cottrell |
| 9,359,759 B2 | 6/2016 | Otamendi |
| 9,374,952 B1 | 6/2016 | Cross |
| 9,380,751 B2 | 7/2016 | Storey |
| 9,445,557 B2 | 9/2016 | Darlington |
| 9,468,154 B2 | 10/2016 | Carpenter |
| 9,474,217 B2 | 10/2016 | Anderson et al. |
| 9,491,915 B2 | 11/2016 | Storey |
| 9,510,524 B2 | 12/2016 | Anderson et al. |
| 9,591,814 B2 | 3/2017 | Collins et al. |
| 9,730,400 B2 | 8/2017 | Wilson et al. |
| 9,814,186 B2 | 11/2017 | Anderson et al. |
| 9,854,750 B2 | 1/2018 | Brusatore |
| 9,924,639 B1 | 3/2018 | Arrighi |
| 9,974,243 B2 | 5/2018 | Martin |
| 10,022,873 B2 | 7/2018 | Larrea-Tamayo et al. |
| 11,202,418 B2 * | 12/2021 | Friedman .............. A01G 9/246 |
| 2004/0103583 A1 | 6/2004 | Eriksen et al. |
| 2005/0268547 A1 | 12/2005 | Uchiyama |
| 2006/0162252 A1 | 7/2006 | Lim |
| 2006/0201058 A1 | 9/2006 | Ripatti |
| 2007/0033866 A1 | 2/2007 | Henry et al. |
| 2007/0033867 A1 | 2/2007 | Henry et al. |
| 2007/0051036 A1 | 3/2007 | Henry et al. |
| 2007/0051037 A1 | 3/2007 | Henry et al. |
| 2007/0051038 A1 | 3/2007 | Henry et al. |
| 2008/0086942 A1 | 4/2008 | Maier |
| 2009/0139927 A1 | 6/2009 | Kania et al. |
| 2009/0223126 A1 | 9/2009 | Gamer et al. |
| 2011/0005132 A1 | 1/2011 | Kania et al. |
| 2011/0005133 A1 | 1/2011 | Kania et al. |
| 2011/0005134 A1 | 1/2011 | Kania et al. |
| 2011/0005444 A1 | 1/2011 | Kania et al. |
| 2011/0005446 A1 | 1/2011 | Kania et al. |
| 2011/0005447 A1 | 1/2011 | Kania et al. |
| 2011/0005449 A1 | 1/2011 | Kania et al. |
| 2011/0131876 A1 | 6/2011 | Pettibone |
| 2011/0146559 A1 | 6/2011 | Kania et al. |
| 2012/0167460 A1 | 7/2012 | Omidi |
| 2012/0279122 A1 | 11/2012 | Benne et al. |
| 2012/0285084 A1 | 11/2012 | Hu |
| 2013/0019527 A1 | 1/2013 | Howe-Sylvain |
| 2013/0067814 A1 | 3/2013 | Riley et al. |
| 2013/0298462 A1 | 11/2013 | Moran |
| 2014/0000162 A1 | 1/2014 | Blank |
| 2014/0137472 A1 | 5/2014 | Anderson et al. |
| 2014/0223816 A1 | 8/2014 | Parker |
| 2014/0259904 A1 | 9/2014 | Collard |
| 2014/0318010 A1 | 10/2014 | Tomlinson |
| 2014/0366443 A1 | 12/2014 | Brusatore |
| 2015/0027051 A1 | 1/2015 | Anderson et al. |
| 2015/0230419 A1 | 8/2015 | Ishizaka et al. |
| 2015/0351329 A1 | 12/2015 | Heidl et al. |
| 2016/0000018 A1 | 1/2016 | Elmpt et al. |
| 2016/0073589 A1 | 3/2016 | Mcnamara et al. |
| 2016/0135393 A1 | 5/2016 | Ruanova |
| 2016/0135398 A1 | 5/2016 | Mathieu et al. |
| 2016/0192594 A1 | 7/2016 | Mawendra |
| 2016/0212946 A1 | 7/2016 | Higgins |
| 2016/0227722 A1 | 8/2016 | Storey |
| 2016/0235025 A1 | 8/2016 | Bray |
| 2016/0270304 A1 | 9/2016 | Higgins |
| 2017/0000038 A1 | 1/2017 | Collard |
| 2017/0013810 A1 | 1/2017 | Grabell et al. |
| 2017/0020082 A1 | 1/2017 | Storey |
| 2017/0027119 A1 | 2/2017 | Storey |
| 2017/0055460 A1 | 3/2017 | Brusatore |
| 2017/0055461 A1 | 3/2017 | Neuhoff, Jr. et al. |
| 2017/0055474 A1 | 3/2017 | Storey |
| 2017/0064912 A1 | 3/2017 | Tabakman |
| 2017/0086399 A1 | 3/2017 | Anderson et al. |
| 2017/0181393 A1 | 6/2017 | Nelson |
| 2017/0202162 A1 | 7/2017 | Dufresne et al. |
| 2017/0231167 A1 | 8/2017 | Storey |
| 2017/0231168 A1 | 8/2017 | Storey |
| 2017/0303484 A1 | 10/2017 | Wilson et al. |
| 2017/0303485 A1 | 10/2017 | Wilson et al. |
| 2017/0339841 A1 | 11/2017 | Monasterio |
| 2017/0347537 A1 | 12/2017 | Beaulieu |
| 2018/0007850 A1 | 1/2018 | Dufresne et al. |
| 2018/0014471 A1 | 1/2018 | Jensen et al. |
| 2018/0014485 A1 | 1/2018 | Whitcher et al. |
| 2018/0014486 A1 | 1/2018 | Creechley et al. |
| 2018/0042186 A1 | 2/2018 | Kop |
| 2018/0077884 A1 | 3/2018 | Barker et al. |
| 2018/0084713 A1 | 3/2018 | Ito et al. |
| 2018/0084739 A1 | 3/2018 | Bottari |
| 2018/0098513 A1 | 4/2018 | Ritchie |
| 2018/0098515 A1 | 4/2018 | Anderson et al. |
| 2018/0146618 A1 | 5/2018 | Elazary et al. |
| 2018/0153113 A1 | 6/2018 | Storey et al. |
| 2018/0153115 A1 | 6/2018 | Edke et al. |
| 2018/0168108 A1 | 6/2018 | Foreman et al. |
| 2018/0206414 A1 | 7/2018 | Goodman et al. |

FOREIGN PATENT DOCUMENTS

| | | | |
|---|---|---|---|
| WO | WO-2005009691 A1 * | 2/2005 | ............ B25J 9/0084 |
| WO | 2017205420 A1 | 11/2017 | |

(56) References Cited

FOREIGN PATENT DOCUMENTS

| WO | 2017217130 A1 | 12/2017 |
| WO | 2018037577 A1 | 3/2018 |
| WO | 2018175794 A1 | 9/2018 |
| WO | 2019183244 A2 | 9/2019 |

OTHER PUBLICATIONS

International Application No. PCT/US2019/023201, Written Opinion mailed Oct. 4, 2019, 11 pgs.
International Application No. PCT/US2019/058764, Search Report mailed Apr. 3, 2020, 6 pgs.
International Application No. PCT/US2019/058764, Written Opinion, 14 pgs.
International Application No. PCT/US2019/058770, Search Report mailed Jan. 13, 2020, 2 pgs.
International Application No. PCT/US2019/058770, Written Opinion mailed Jan. 13, 2020, 8 pgs.

* cited by examiner

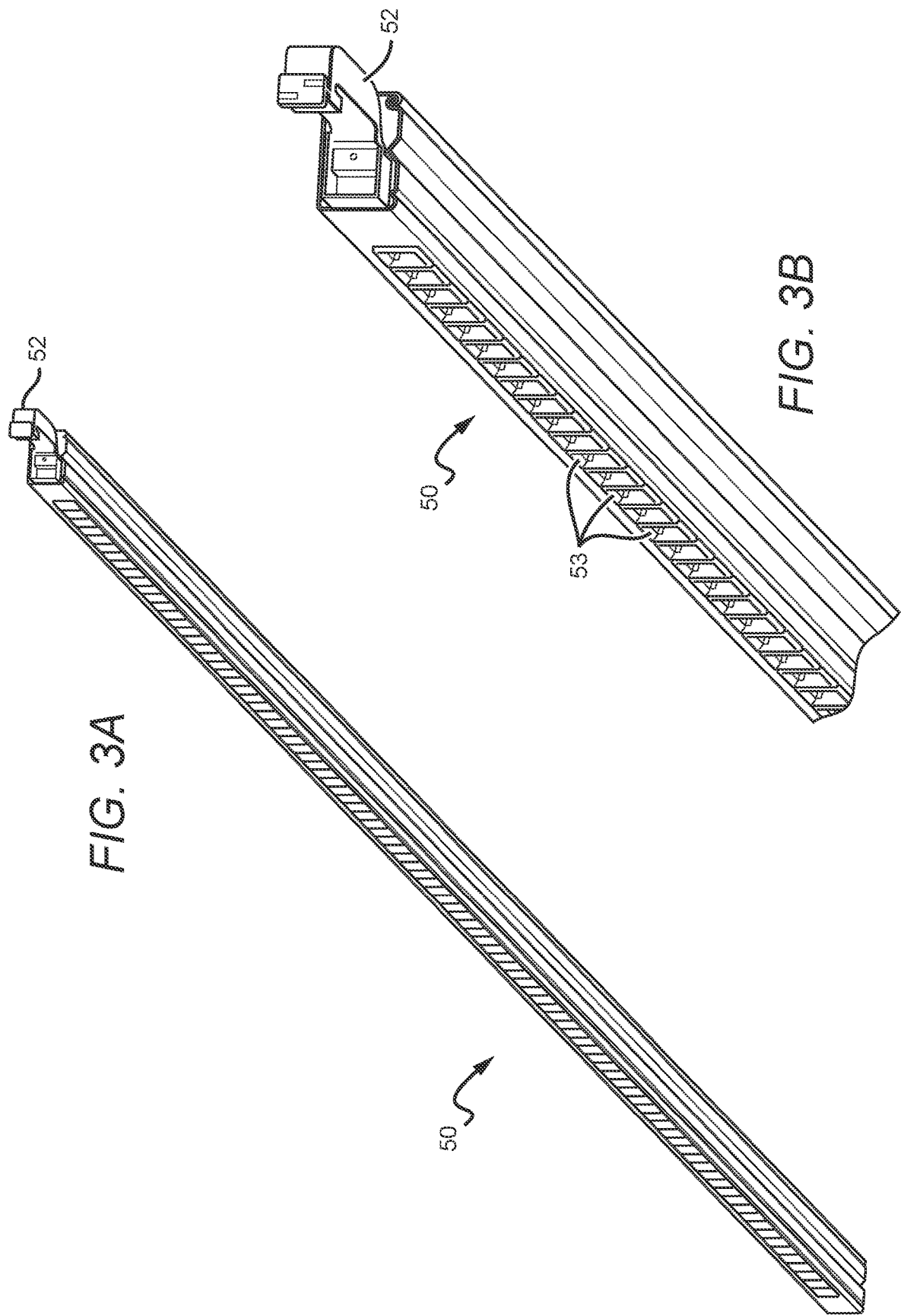

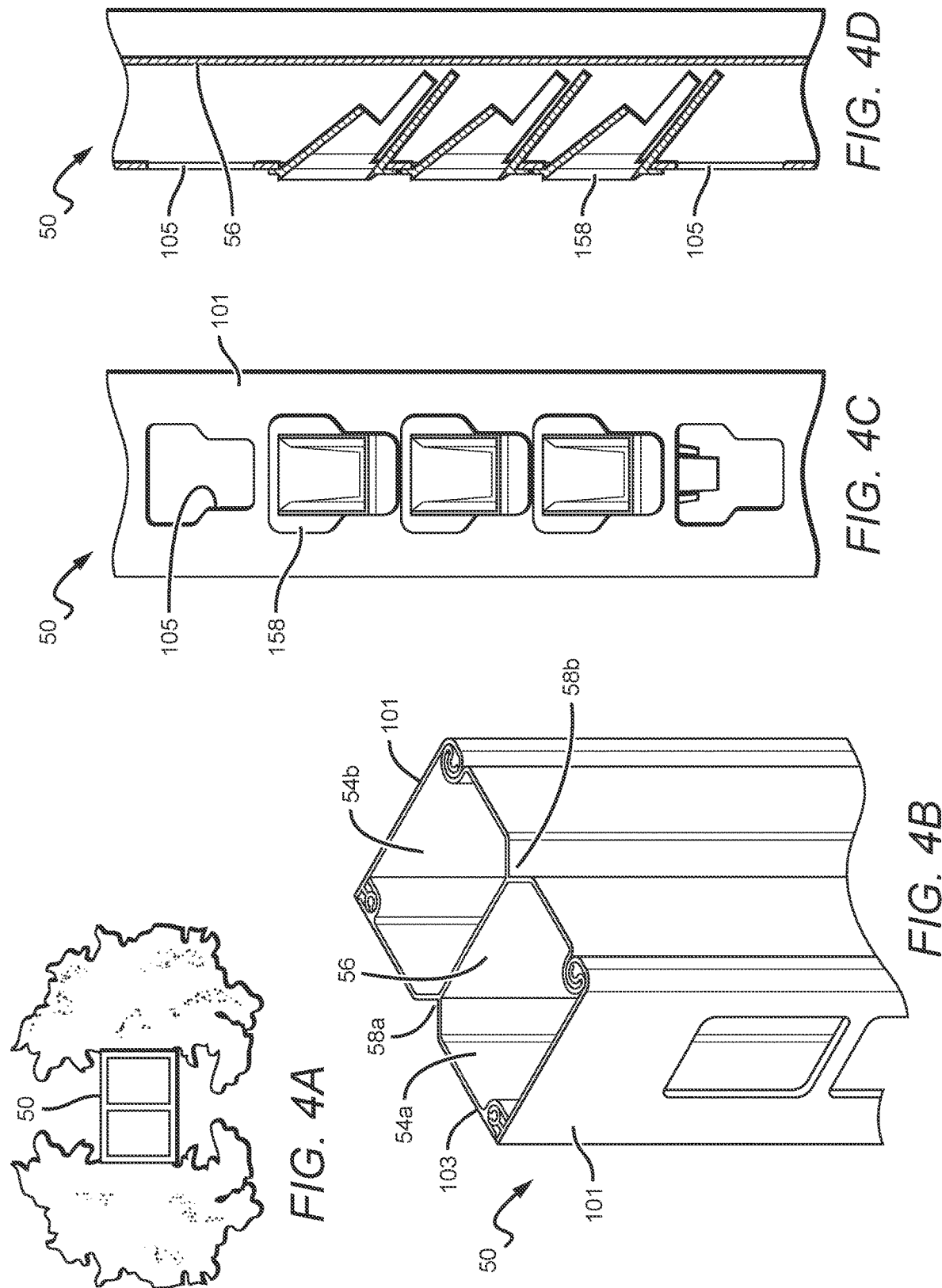

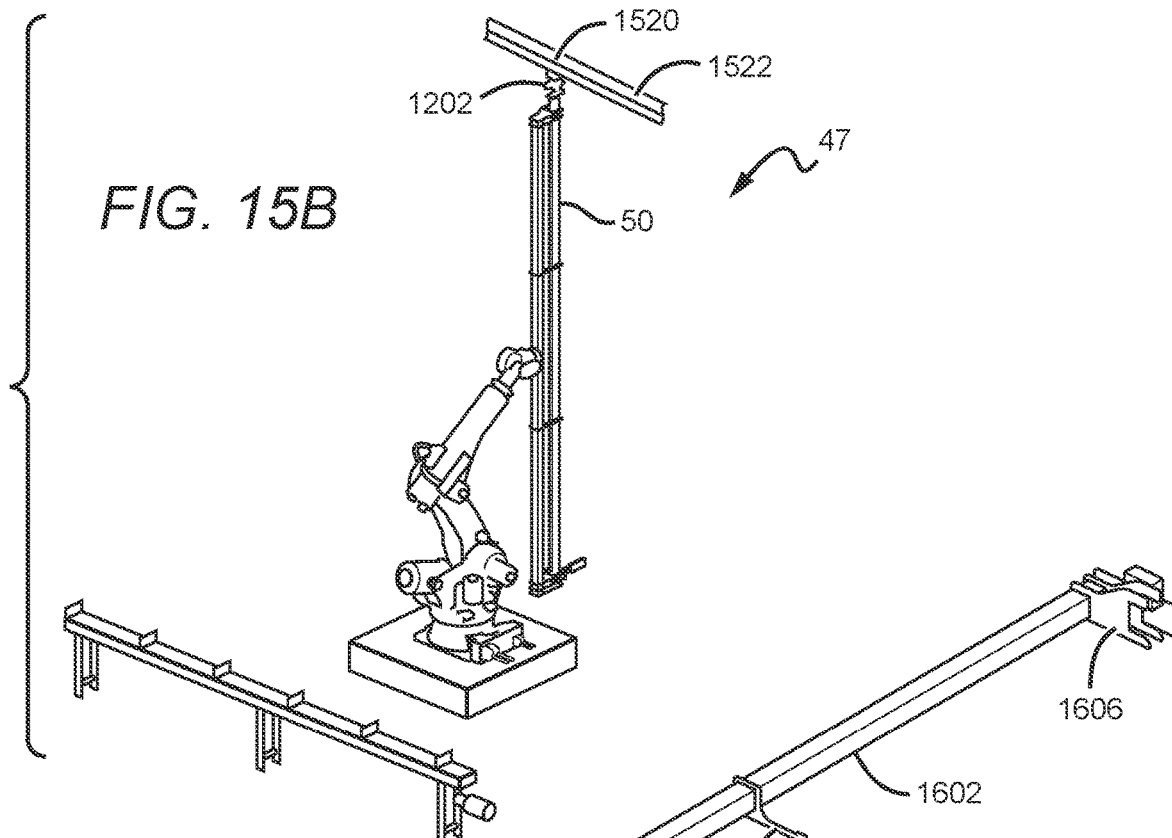
FIG. 15B
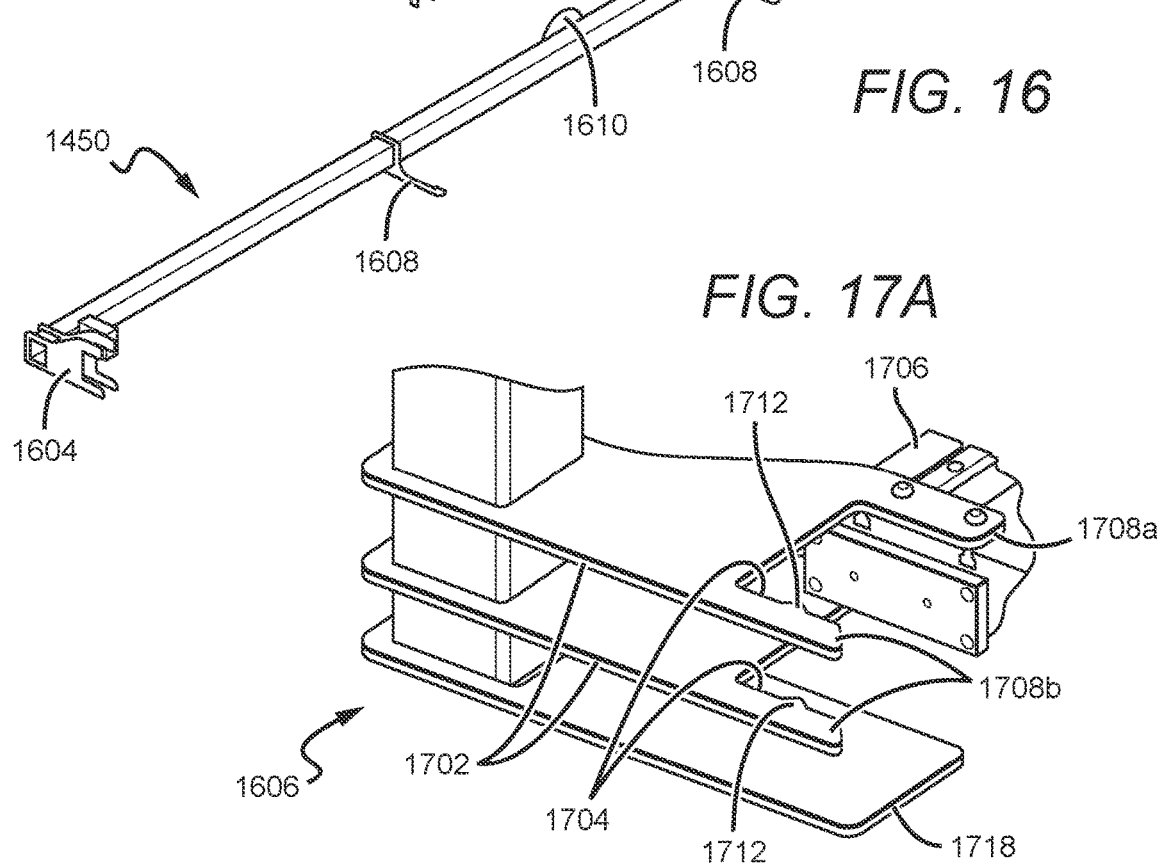
FIG. 16
FIG. 17A

PRODUCTION FACILITY LAYOUT FOR AUTOMATED CONTROLLED ENVIRONMENT AGRICULTURE

CROSS-REFERENCE TO RELATED APPLICATION

The present application is a continuation of U.S. application Ser. No. 17/281,694 filed Mar. 31, 2021, which is a National Stage Entry of Application Ser. No. PCT/US2019/058770, filed Oct. 30, 2019, which claims priority to U.S. Application Ser. No. 62/752,980 filed Oct. 30, 2018, the disclosure of which is incorporated by reference herein for all purposes.

BACKGROUND

Field of the Disclosure

The disclosure relates generally to controlled environment agriculture and, more particularly, to production facility layouts and configurations for automated controlled environment crop production systems.

Description of Related Art

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

During the twentieth century, agriculture slowly began to evolve from a conservative industry to a fast-moving high-tech industry. Global food shortages, climate change and societal changes drove a move away from manually-implemented agriculture techniques toward computer-implemented technologies. In the past, and in many cases still today, farmers only had one growing season to produce the crops that would determine their revenue and food production for the entire year. However, this is changing. With indoor growing as an option and with better access to data processing technologies, the science of agriculture has become more agile. It is adapting and learning as new data is collected and insights are generated.

Advancements in technology are making it feasible to control the effects of nature with the advent of "controlled environment agriculture." Improved efficiencies in space utilization, lighting, and a better understanding of hydroponics, aeroponics, crop cycles, and advancements in environmental control systems have allowed humans to better recreate environments conducive for agriculture crop growth with the goals of greater yield per square foot, better nutrition and lower cost.

US Patent Publication Nos. 2018/0014485 and 2018/0014486, both assigned to the assignee of the present disclosure and incorporated by reference in their entirety herein, describe environmentally controlled vertical farming systems. The vertical farming structure (e.g., a vertical column) may be moved about an automated conveyance system in an open or closed-loop fashion, exposed to precision-controlled lighting, airflow and humidity, with ideal nutritional support.

US Patent Pub. No. US 2017/0055460 ("Brusatore") describes a system for continuous automated growing of plants. A vertical array of plant supporting arms extends radially from a central axis. Each arm includes pot receptacles which receive the plant seedling, and liquid nutrients and water. The potting arms are rotated beneath grow lamps and pollinating arms. However, the spacing between plants appears to be fixed.

U.S. Pat. No. 2,244,677 to Cornell describes a plant production system that conveys vertical box-shaped frame within a greenhouse structure. A chain-drive mechanism conveys the vertical box-like frames in a track where they are exposed to controlled environmental conditions. Cornell, however, does not contemplate automated processing or harvesting of the crops grown in the box-like frames.

SUMMARY OF THE DISCLOSURE

The present disclosure is directed to facility layouts and configurations for an automated crop production system for controlled environment agriculture. In particular implementations, the core of the facility comprises a controlled growth environment and a central processing system. The controlled growth environment includes systems for exposing crops housed in modules, such as grow towers, to controlled environmental conditions. The central processing system may include various stations and functionality both for preparing crop-bearing modules to be inserted in the controlled growth environment, for harvesting crops from the crop-bearing modules after they have been extracted from the controlled growth environment, and for cleaning or washing crop-bearing modules for re-use. The remaining aspects of the crop production facility—such as seeding stations, propagation facilities, packaging stations and storage facilities—are arranged to achieve one or more desired efficiencies relating to capital expenditures or operating costs associated with an automated crop production facility.

BRIEF DESCRIPTION OF THE DRAWINGS

FIGS. 3A and 3B are perspective views of an example grow tower.

FIG. 4A is a top view of an example grow tower; FIG. 4B is a perspective, top view of an example grow tower; FIG. 4C is an elevation view of a section of an example grow tower; and FIG. 4D is a sectional, elevation view of a portion of an example grow tower.

FIG. 16 is a perspective view of an example end effector for use in an automated pickup or laydown station.

FIGS. 17A and 17B are partial, perspective views of an example gripper assembly mounted to an end effector for releasably grasping grow towers.

DETAILED DESCRIPTION

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

Operating cost and capital expenditure concerns are key drivers to commercial implementation of large-scale controlled environment agriculture. Commercial scale, indoor crop production facilities include a large array of processing stations and equipment. For example, indoor crop production facilities may include stations and related equipment to: fill plug trays with soil and seed them; grow crops from seed to a stage ready for transplant; transplant the seedlings to a crop-holding module; transfer the crop-holding module to a growth environment; harvest crops in the crop-holding module; clean and package the harvested crop; and store the harvested crop. Commercial scale facilities may also include loading bays and inventory handling mechanisms to receive inbound supplies used in operating the facility and to ship out the resulting crop. Arranging these stations and equipment in an efficient manner can be a complex task and is extremely important to the success of a commercial-scale facility. Factors that this disclosure considers to increase cost efficiency include space utilization and total flow distance of product from seed stage to harvest and packaging. Other factors considered include the total length of materials required to construction the facility (such as total length of walls, HVAC ducting and the like), and the distances that facility workers are required to travel during standard processing operations. These factors, as well as equipment layout clearances and local fire and building regulations, may combine to yield a crop production facility layout.

Figure 1:
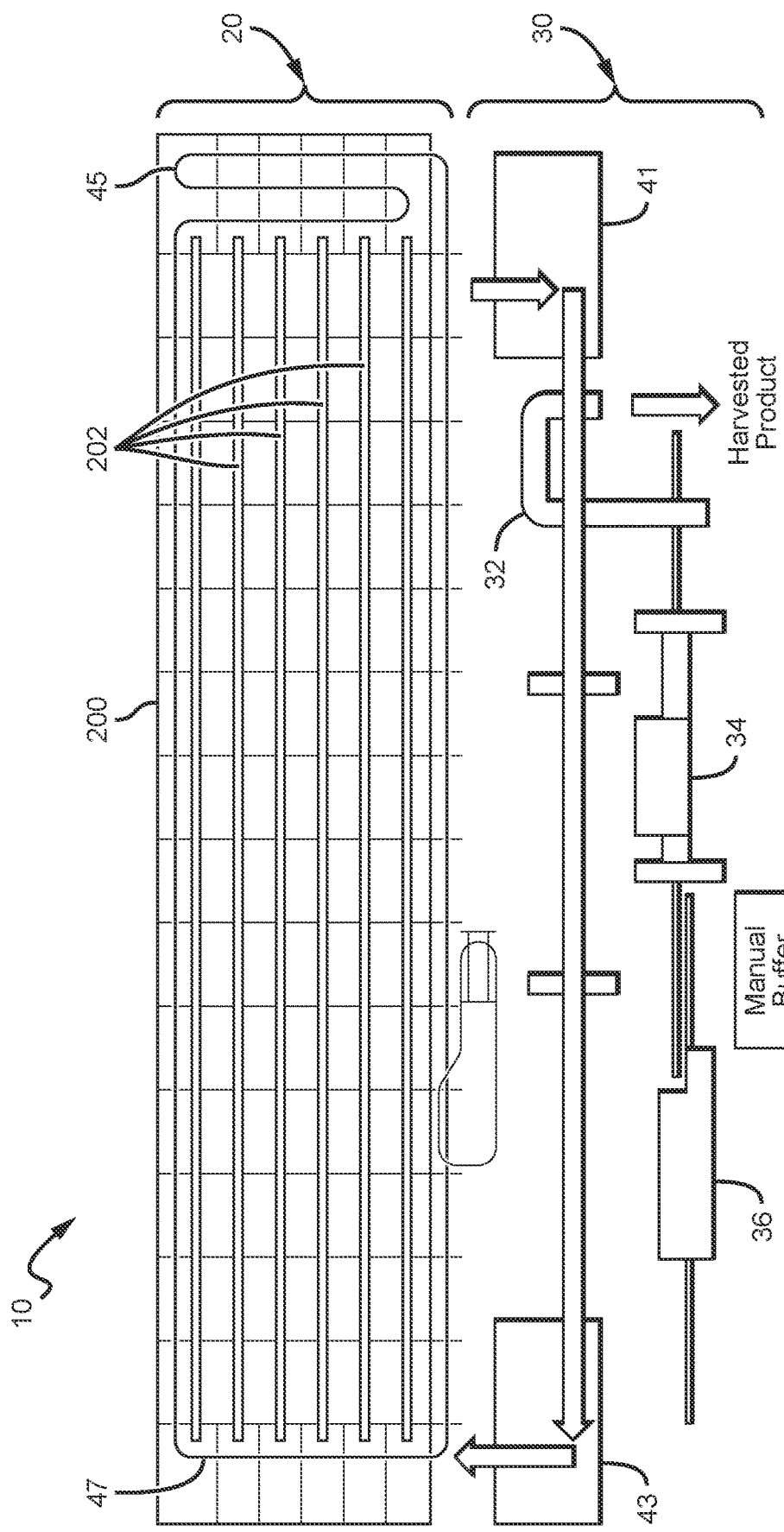
FIG. 1 is a functional block diagram illustrating an example controlled environment agriculture system.
Figure 2:
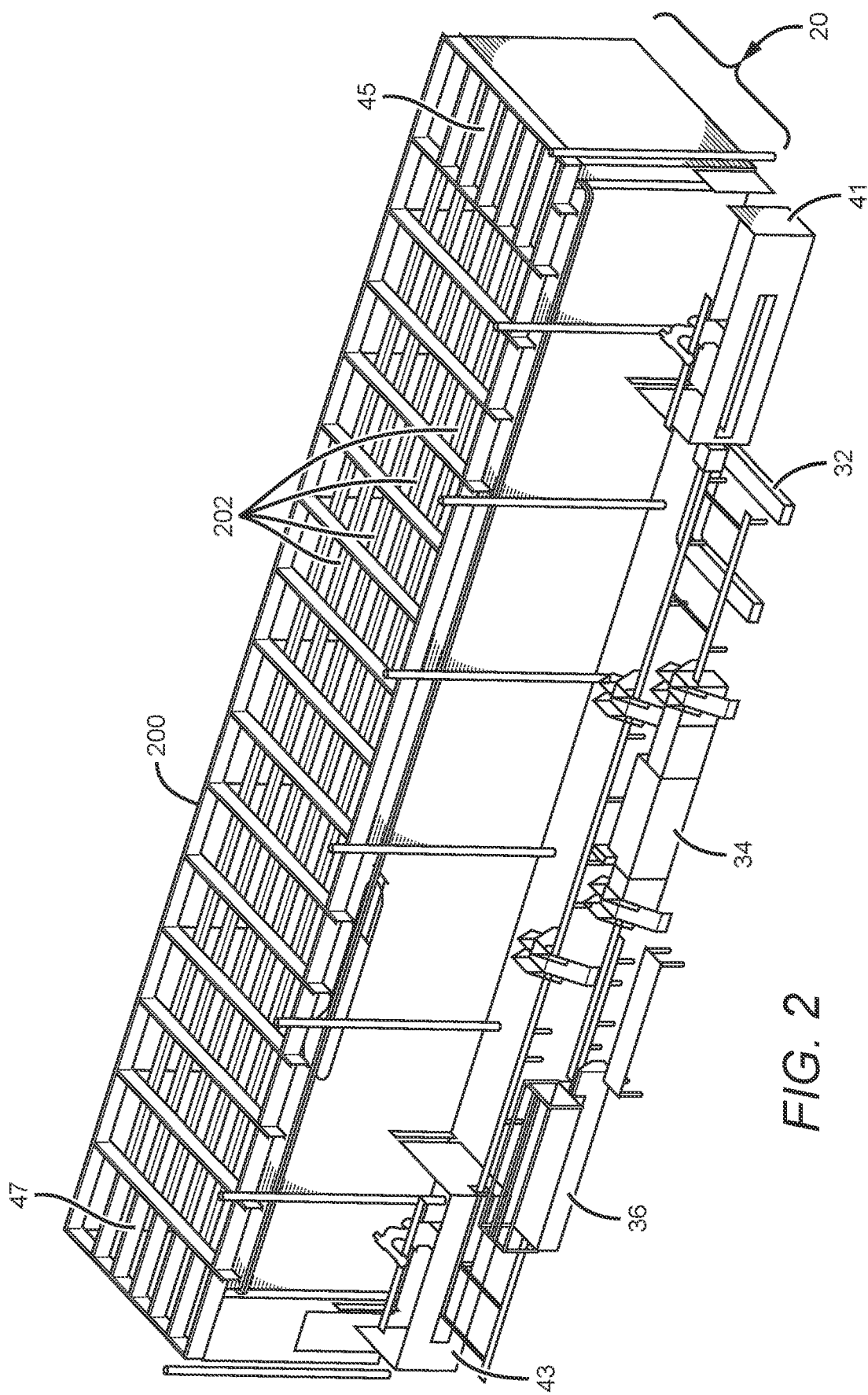
FIG. 2 is a perspective view of an example controlled environment agriculture system.

The following describes a vertical farm production system configured for high density growth and crop yield. FIGS. 1 and 2 illustrate a controlled environment agriculture system 10 according to one possible embodiment of the invention. At a high level, the system 10 may include an environmentally-controlled growing chamber 20, a vertical tower conveyance system 200 disposed within the growing chamber 20 and configured to convey grow towers 50 with crops disposed therein, and a central processing facility 30. The central processing facility 30 may be a clean room environment to keep contaminants and pollutants within acceptable limits. Air filtration, transfer and other systems may be employed to effect a clean room environment to meet required food safety standards.

The growing chamber 20 may contain one to a plurality of vertical grow lines 202 that include conveyance systems to translate grow towers 50 along the grow lines 202 within the growing chamber 20. The crops or plants species that may be grown may be gravitropic/geotropic and/or phototropic, or some combination thereof. The crops or plant species may vary considerably and include various leaf vegetables, fruiting vegetables, flowering crops, fruits and the like. The controlled environment agriculture system 10 may be configured to grow a single crop type at a time or to grow multiple crop types concurrently.

The system 10 may also include conveyance systems for moving the grow towers in a circuit throughout the crop's growth cycle, the circuit comprising a staging area configured for loading the grow towers into and out of the vertical tower conveyance mechanism 200. The central processing system 30 may include one or more conveyance mechanisms for directing grow towers to stations in the central processing system 30—e.g., stations for loading plants into, and harvesting crops from, the grow towers. The vertical tower conveyance system 200, within the growing chamber 20, is configured to support and translate one or more grow towers 50 along grow lines 202. Each grow tower 50 is configured for containing plant growth media that supports a root structure of at least one crop plant growing therein. Each grow tower 50 is also configured to releasably attach to a grow line 202 in a vertical orientation and move along the grow line 202 during a growth phase. Together, the vertical tower conveyance mechanism 200 and the central processing system 30 (including associated conveyance mechanisms) can be arranged in a production circuit under control of one or more computing systems.

The growth environment 20 may include light emitting sources positioned at various locations between and along the grow lines 202 of the vertical tower conveyance system 200. The light emitting sources can be positioned laterally relative to the grow towers 50 in the grow line 202 and configured to emit light toward the lateral faces of the grow towers 50 that include openings from which crops grow. The light emitting sources may be incorporated into a water-cooled, LED lighting system as described in U.S. Publ. No. 2017/0146226A1, the disclosure of which is incorporated by reference herein. In such an embodiment, the LED lights may be arranged in a bar-like structure. The bar-like structure may be placed in a vertical orientation to emit light laterally to substantially the entire length of adjacent grow towers 50. Multiple light bar structures may be arranged in the growth environment 20 along and between the grow lines 202. Other lighting systems and configurations may be employed. For example, the light bars may be arranged horizontally between grow lines 202.

The growth environment 20 may also include a nutrient supply system configured to supply an aqueous crop nutrient solution to the crops as they translate through the growth chamber 20. As discussed in more detail below, the nutrient supply system may apply aqueous crop nutrient solution to the top of the grow towers 50. Gravity may cause the solution travel down the vertically-oriented grow tower 50 and through the length thereof to supply solution to the crops disposed along the length of the grow tower 50. The growth environment 20 may also include an airflow source configured to, when a tower is mounted to a grow line 202, direct airflow in the lateral growth direction of growth and through an under-canopy of the growing plant, so as to disturb the boundary layer of the under-canopy of the growing plant. In other implementations, airflow may come from the top of the canopy or orthogonal to the direction of plant growth. The growth environment 20 may also include a control system, and associated sensors, for regulating at least one growing condition, such as air temperature, airflow speed, relative air humidity, and ambient carbon dioxide gas content. The control system may for example include such sub-systems as HVAC units, chillers, fans and associated ducting and air handling equipment. Grow towers may have identifying attributes (such as bar codes or RFID tags). The controlled environment agriculture system 10 may include corresponding sensors and programming logic for tracking the grow towers 50 during various stages of the farm production cycle and/or for controlling one or more conditions of the growth environment. The operation of control system and the length of time towers remain in growth environment can vary considerably depending on a variety of factors, such as crop type and other factors.

As discussed above, grow towers 50 with newly transplanted crops or seedlings are transferred from the central processing system 30 into the vertical tower conveyance system 200. Vertical tower conveyance system 200 moves the grow towers 50 along respective grow lines 202 in growth environment 20 in a controlled fashion, as discussed in more detail below. Crops disposed in grow towers 50 are exposed to the controlled conditions of growth environment (e.g., light, temperature, humidity, air flow, aqueous nutrient supply, etc.). The control system is capable of automated adjustments to optimize growing conditions within the growth chamber 20 to make continuous improvements to various attributes, such as crop yields, visual appeal and nutrient content. In addition, US Patent Publication Nos. 2018/0014485 and 2018/0014486 describe application of machine learning and other operations to optimize grow conditions in a vertical farming system. In some implementations, environmental condition sensors may be disposed on grow towers 50 or at various locations in growth environment 20. When crops are ready for harvesting, grow towers 50 with crops to be harvested are transferred from the vertical tower conveyance system 200 to the central processing system 30 for harvesting and other processing operations.

Central processing system 30, as discussed in more detail below, may include processing stations directed to injecting seedlings into towers 50, harvesting crops from towers 50, and cleaning towers 50 that have been harvested. Central processing system 30 may also include conveyance mechanisms that move towers 50 between such processing stations. For example, as FIG. 1 illustrates, central processing system 30 may include harvester station 32, washing station 34, and transplanter station 36. Harvester station 32 may deposit harvested crops into food-safe containers and may include a conveyance mechanism for conveying the containers to post-harvesting facilities (e.g., preparation, washing, packaging and storage) that are beyond the scope of this disclosure.

Controlled environment agriculture system 10 may also include one or more conveyance mechanisms for transferring grow towers 50 between growth environment 20 and central processing system 30. In the implementation shown, the stations of central processing system 30 operate on grow towers 50 in a horizontal orientation. In one implementation, an automated pickup station 43, and associated control logic, may be operative to releasably grasp a horizontal tower from a loading location, rotate the tower to a vertical orientation and attach the tower to a transfer station for insertion into a selected grow line 202 of the growth environment 20. On the other end of growth environment 20, automated laydown station 41, and associated control logic, may be operative to releasably grasp and move a vertically-oriented grow tower 50 from a buffer location, rotate the grow tower 50 to a horizontal orientation and place it on a conveyance system for loading into harvester station 32. In some implementations, if a grow tower 50 is rejected due to quality control concerns, the conveyance system may bypass the harvester station 32 and carry the grow tower to washing station 34 (or some other station). The automated laydown and pickup stations 41 and 43 may each comprise a six-degrees of freedom robotic arm, such as a FANUC robot. The stations 41 and 43 may also include end effectors for releasably grasping grow towers 50 at opposing ends.

Figure 12:
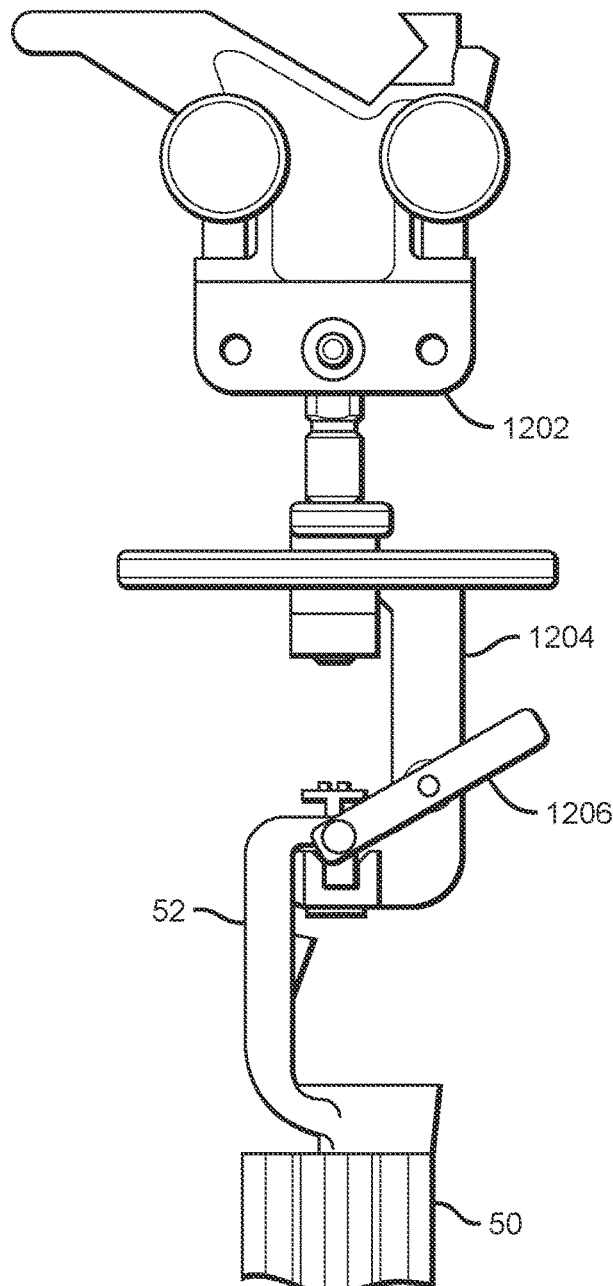
FIG. 12 is an elevation view of an example carriage assembly.
Figure 13B:
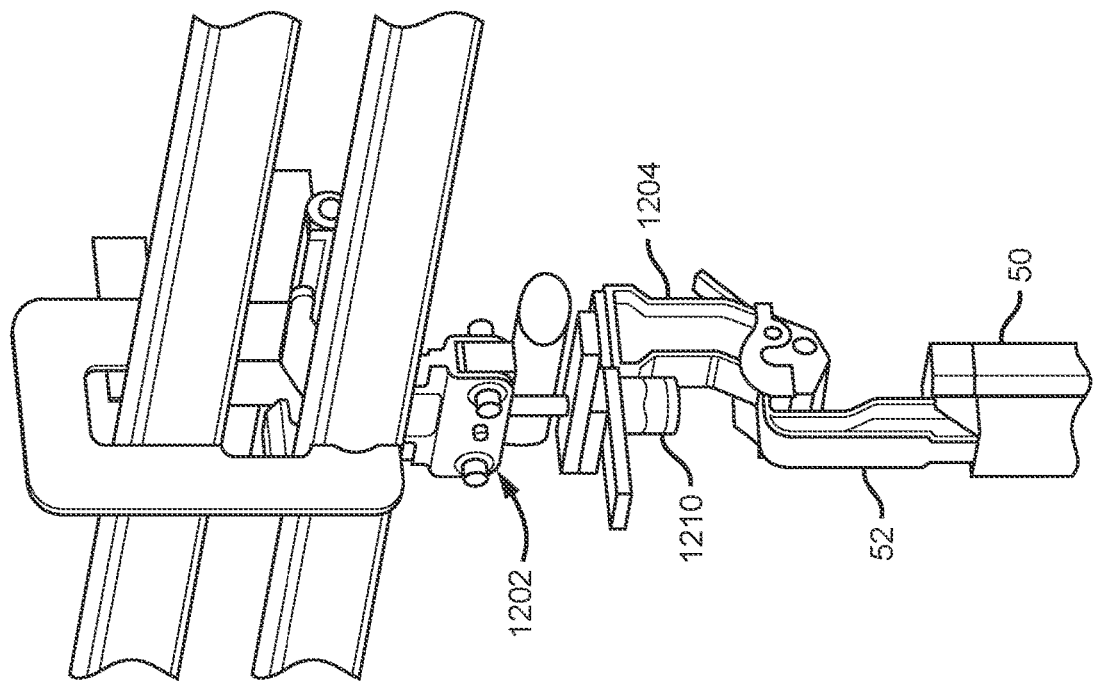
FIG. 13B is a perspective view of the example carriage assembly.
Figure 13A:
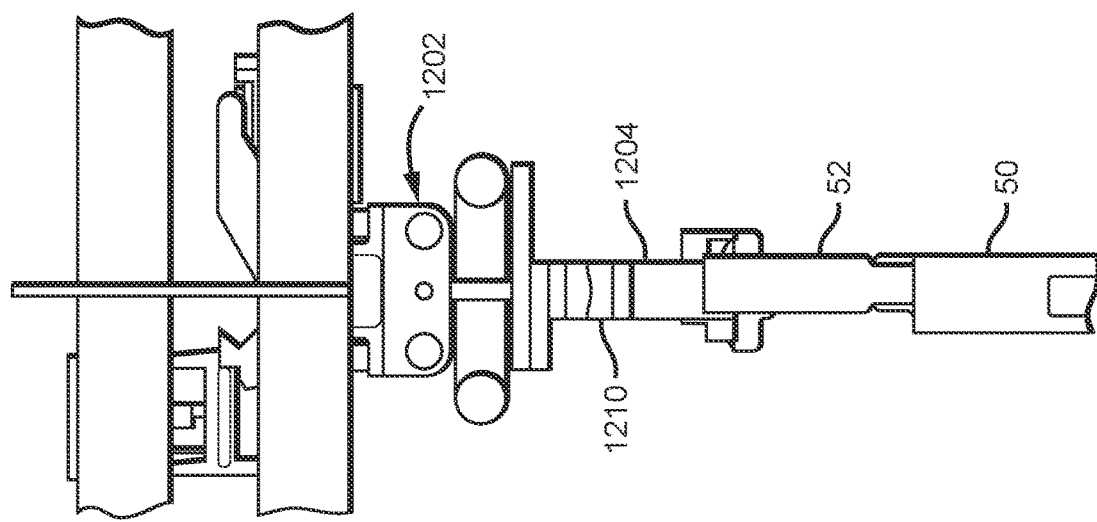
FIG. 13A is an elevation view of the example carriage assembly from an alternative angle to FIG. 12.

Growth environment 20 may also include automated loading and unloading mechanisms for inserting grow towers 50 into selected grow lines 202 and unloading grow towers 50 from the grow lines 202. In one implementation, the load transfer conveyance mechanism 47 may include a powered and free conveyor system that conveys carriages each loaded with a grow tower 50 from the automated pickup station 43 to a selected grow line 202. Vertical grow tower conveyance system 200 may include sensors (such as RFID or bar code sensors) to identify a given grow tower 50 and, under control logic, select a grow line 202 for the grow tower 50. Particular algorithms for grow line selection can vary considerably depending on a number of factors and is beyond the scope of this disclosure. The load transfer conveyance mechanism 47 may also include one or more linear actuators that pushes the grow tower 50 onto a grow line 202. Similarly, the unload transfer conveyance mechanism 45 may include one or more linear actuators that push or pull grow towers from a grow line 202 onto a carriage of another powered and free conveyor mechanism, which conveys the carriages 1202 from the grow line 202 to the automated laydown station 41. FIG. 12 illustrates a carriage 1202 that may be used in a powered and free conveyor mechanism. In the implementation shown, carriage 1202 includes hook 1204 that engages hook 52 attached to a grow tower 50. A latch assembly 1206 may secure the grow tower 50 while it is being conveyed to and from various locations in the system. In one implementation, one or both of load transfer conveyance mechanism 47 and unload transfer conveyance mechanism 45 may be configured with a sufficient track distance to establish a zone where grow towers 50 may be buffered. For example, unload transfer conveyance mechanism 45 may be controlled such that it unloads a set of towers 50 to be harvested unto carriages 1202 that are moved to a buffer region of the track. On the other end, automated pickup station 43 may load a set of towers to be inserted into growth environment 20 onto carriages 1202 disposed in a buffer region of the track associated with load transfer conveyance mechanism 47.

Grow Towers

Grow towers 50 provide the sites for individual crops to grow in the system. As FIGS. 3A and 3B illustrate, a hook 52 attaches to the top of grow tower 50. Hook 52 allows grow tower 50 to be supported by a grow line 202 when it is inserted into the vertical tower conveyance system 200. In one implementation, a grow tower 50 measures 5.172 meters long, where the extruded length of the tower is 5.0 meters, and the hook is 0.172 meters long. The extruded rectangular profile of the grow tower 50, in one implementation, measures 57 mm×93 mm (2.25"×3.67"). The hook 52 can be designed such that its exterior overall dimensions are not greater than the extruded profile of the grow tower 50. The foregoing dimensions are for didactic purposes. The dimensions of grow tower 50 can be varied depending on a number of factors, such as desired throughput, overall size of the system, and the like.

Grow towers 50 may include a set of grow sites 53 arrayed along at least one face of the grow tower 50. In the implementation shown in FIG. 4A, grow towers 50 include grow sites 53 on opposing faces such that plants protrude from opposing sides of the grow tower Transplanter station 36 may transplant seedlings into empty grow sites 53 of grow towers where they remain in place until they are fully mature and ready to be harvested. In one implementation, the orientation of the grow sites 53 are perpendicular to the direction of travel of the grow towers 50 along grow line 202. In other words, when a grow tower 50 is inserted into a grow line 202, plants extend from opposing faces of the grow tower 50, where the opposing faces are parallel to the direction of travel. Although a dual-sided configuration is preferred, the invention may also be utilized in a single-sided configuration where plants grow along a single face of a grow tower 50.

U.S. application Ser. No. 15/968,425 filed on May 1, 2018 which is incorporated by reference herein for all purposes, discloses an example tower structure configuration that can be used in connection with various embodiments of the invention. In the implementation shown, grow towers 50 may each consist of three extrusions which snap together to form one structure. As shown, the grow tower 50 may be a dual-sided hydroponic tower, where the tower body 103 includes a central wall 56 that defines a first tower cavity 54a and a second tower cavity 54b. FIG. 4B provides a perspective view of an exemplary dual-sided, multi-piece hydroponic grow tower 50 in which each front face plate 101 is hingeably coupled to the tower body 103. In FIG. 4B, each front face plate 101 is in the closed position. The cross-section of the tower cavities 54a, 54b may be in the range of 1.5 inches by 1.5 inches to 3 inches by 3 inches, where the term "tower cavity" refers to the region within the body of the tower and behind the tower face plate. The wall thickness of the grow towers 50 maybe within the range of 0.065 to 0.075 inches. A dual-sided hydroponic tower, such as that shown in FIGS. 4A and 4B, has two back-to-back cavities 54a and 54b, each preferably within the noted size range. In the configuration shown, the grow tower 50 may include (i) a first V-shaped groove 58a running along the length of a first side of the tower body 103, where the first V-shaped groove is centered between the first tower cavity and the second tower cavity; and (ii) a second V-shaped groove 58b running along the length of a second side of the tower body 103, where the second V-shaped groove is centered between the first tower cavity and the second tower cavity. The V-shaped grooves 58a, 58b may facilitate registration, alignment and/or feeding of the towers 50 by one or more of the stations in central processing system 30. U.S. application Ser. No. 15/968,425 discloses additional details regarding the construction and use of towers that may be used in embodiments of the invention. Another attribute of V-shaped grooves 58a, 58b is that they effectively narrow the central wall 56 to promote the flow of aqueous nutrient solution centrally where the plant's roots are located. Other implementations are possible. For example, a grow tower 50 may be formed as a unitary, single extrusion, where the material at the side walls flex to provide a hinge and allow the cavities to be opened for cleaning. U.S. application Ser. No. 16/577,322 filed on Sep. 20, 2019 which is incorporated by reference herein for all purposes, discloses an example grow tower 50 formed by a single extrusion.

As FIGS. 4C and 4D illustrate, grow towers 50 may each include a plurality of cut-outs 105 for use with a compatible plug holder 158, such as the plug holder disclosed in any one of co-assigned and co-pending U.S. patent application Ser. Nos. 15/910,308, 15/910,445 and 15/910,796, each filed on 2 Mar. 2018, the disclosures of which is incorporated herein for any and all purposes. As shown, the plug holders 158 may be oriented at a 45-degree angle relative to the front face plate 101 and the vertical axis of the grow tower 50. It should be understood, however, that tower design disclosed in the present application is not limited to use with this particular plug holder or orientation, rather, the towers disclosed herein may be used with any suitably sized and/or oriented plug holder. As such, cut-outs 105 are only meant to illustrate, not limit, the present tower design and it should be understood that the present invention is equally applicable to towers with other cut-out designs. Plug Holder 158 may be ultrasonically welded, bonded, or otherwise attached to tower face 101.

The use of a hinged front face plate simplifies manufacturing of grow towers, as well as tower maintenance in general and tower cleaning in particular. For example, to clean a grow tower 50 the face plates 101 are opened from the body 103 to allow easy access to the body cavity 54*a* or 54*b*. After cleaning, the face plates 101 are closed. Since the face plates remain attached to the tower body 103 throughout the cleaning process, it is easier to maintain part alignment and to insure that each face plate is properly associated with the appropriate tower body and, assuming a double-sided tower body, that each face plate 101 is properly associated with the appropriate side of a specific tower body 103. Additionally, if the planting and/or harvesting operations are performed with the face plate 101 in the open position, for the dual-sided configuration both face plates can be opened and simultaneously planted and/or harvested, thus eliminating the step of planting and/or harvesting one side and then rotating the tower and planting and/or harvesting the other side. In other embodiments, planting and/or harvesting operations are performed with the face plate 101 in the closed position.

Other implementations are possible. For example, grow tower 50 can comprise any tower body that includes a volume of medium or wicking medium extending into the tower interior from the face of the tower (either a portion or individual portions of the tower or the entirety of the tower length. For example, U.S. Pat. No. 8,327,582, which is incorporated by reference herein, discloses a grow tube having a slot extending from a face of the tube and a grow medium contained in the tube. The tube illustrated therein may be modified to include a hook 52 at the top thereof and to have slots on opposing faces, or one slot on a single face.

Vertical Tower Conveyance System

Figure 5A:
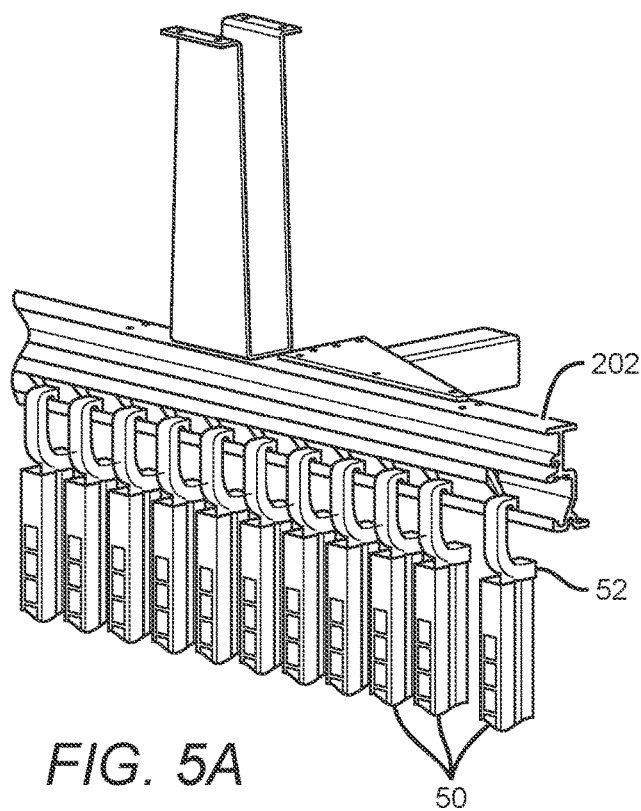
FIG. 5A is a perspective view of a portion of an example grow line.
Figure 5B:
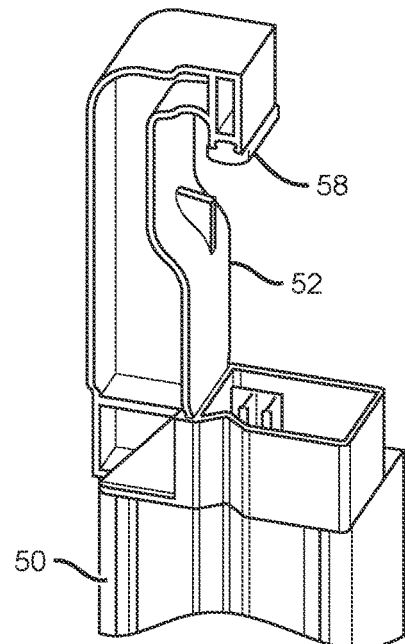
FIG. 5B is a perspective view of an example tower hook.

FIG. 5A illustrates a portion of a grow line 202 in vertical tower conveyance system 200. In one implementation, the vertical tower conveyance system 200 includes a plurality of grow lines 202 arranged in parallel. As discussed above, automated loading and unloading mechanisms 45, 47 may selectively load and unload grow towers 50 from a grow line 202 under automated control systems. As FIG. 5A shows, each grow line 202 supports a plurality of grow towers 50. In one implementation, a grow line 202 may be mounted to the ceiling (or other support) of the grow structure by a bracket for support purposes. Hook 52 hooks into, and attaches, a grow tower 50 to a grow line 202, thereby supporting the tower in a vertical orientation as it is translated through the vertical tower conveyance system 200. A conveyance mechanism moves towers 50 attached to respective grow lines 202.

Figure 8:
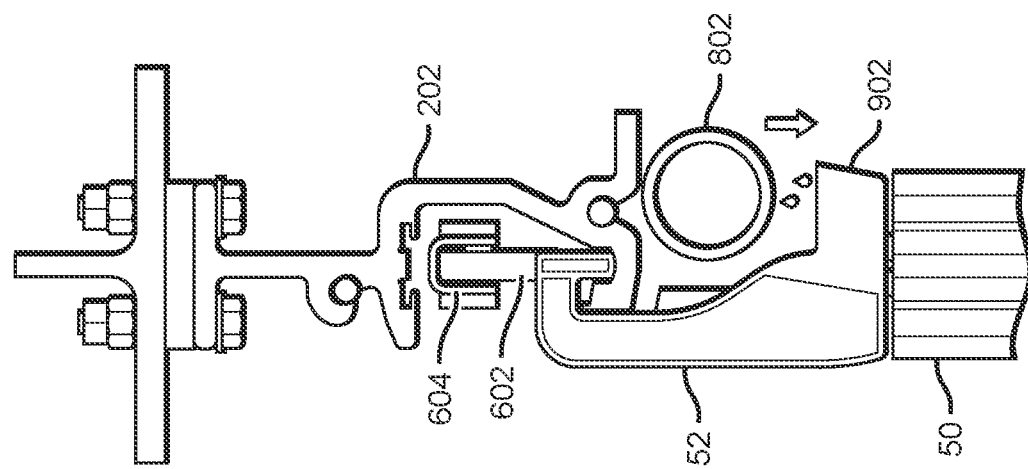
FIG. 8 is a profile view of an example grow line and irrigation supply line.
Figure 10:
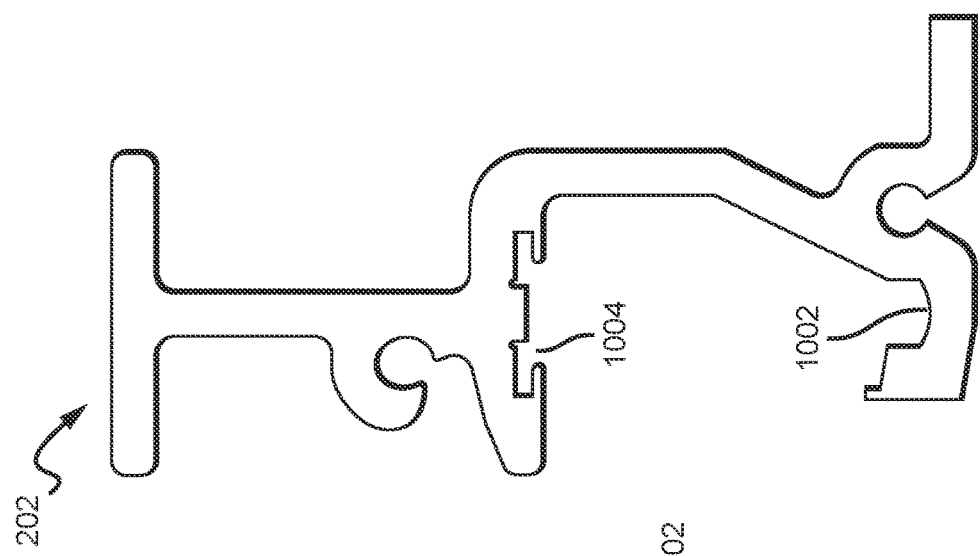
FIG. 10 is a profile view of an example grow line.
Figure 9:
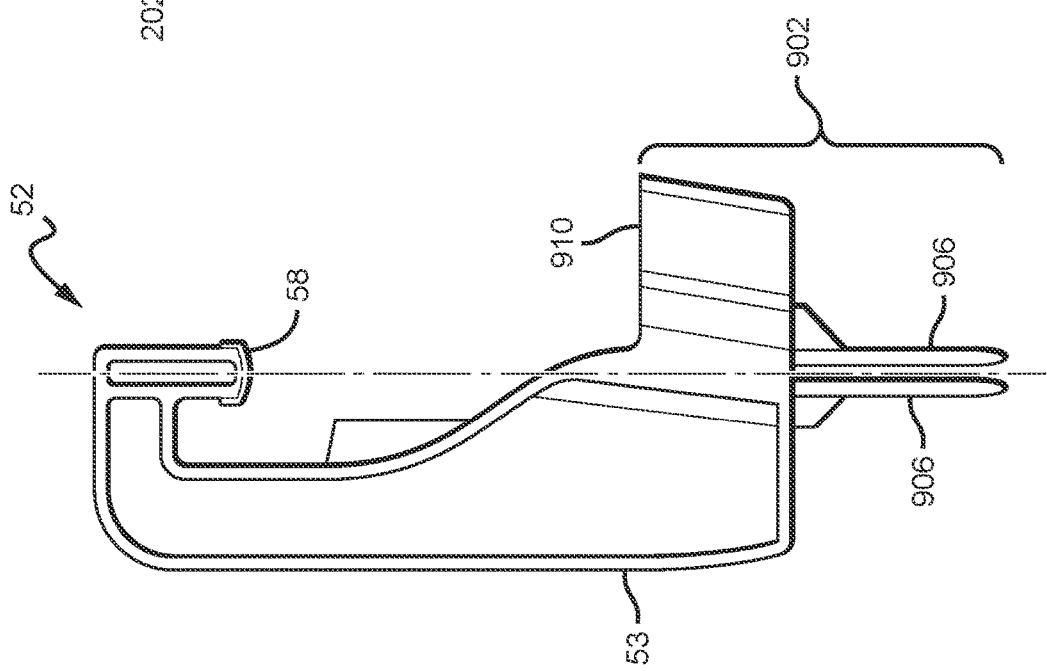
FIG. 9 is a side view of an example tower hook and integrated funnel structure.

FIG. 10 illustrates the cross section or extrusion profile of a grow line 202, according to one possible implementation of the invention. The grow line 202 may be an aluminum extrusion. The bottom section of the extrusion profile of the grow line 202 includes an upward facing groove 1002. As FIG. 9 shows, hook 52 of a grow tower 50 includes a main body 53 and corresponding member 58 that engages groove 1002 as shown in FIGS. 5A and 8. These hooks allow the grow towers 50 to hook into the groove 1002 and slide along the grow line 202 as discussed below. Conversely, grow towers 50 can be manually unhooked from a grow line 202 and removed from production. This ability may be necessary if a crop in a grow tower 50 becomes diseased so that it does not infect other towers. In one possible implementation, the width of groove 1002 (for example, 13 mm) is an optimization between two different factors. First, the narrower the groove the more favorable the binding rate and the less likely grow tower hooks 52 are to bind. Conversely, the wider the groove the slower the grow tower hooks wear due to having a greater contact patch. Similarly, the depth of the groove, for example 10 mm, may be an optimization between space savings and accidental fallout of tower hooks.

Hooks 52 may be injection-molded plastic parts. In one implementation, the plastic may be polyvinyl chloride (PVC), acrylonitrile butadiene styrene (ABS), or an Acetyl Homopolymer (e.g., Delrin® sold by DuPont Company). The hook 52 may be solvent bonded to the top of the grow tower 50 and/or attached using rivets or other mechanical fasteners. The groove-engaging member 58 which rides in the rectangular groove 1002 of the grow line 202 may be a separate part or integrally formed with hook 52. If separate, this part can be made from a different material with lower friction and better wear properties than the rest of the hook, such as ultra-high-molecular weight polyethylene or acetal. To keep assembly costs low, this separate part may snap onto the main body of the hook 52. Alternatively, the separate part also be over-molded onto the main body of hook 52.

Figure 6:
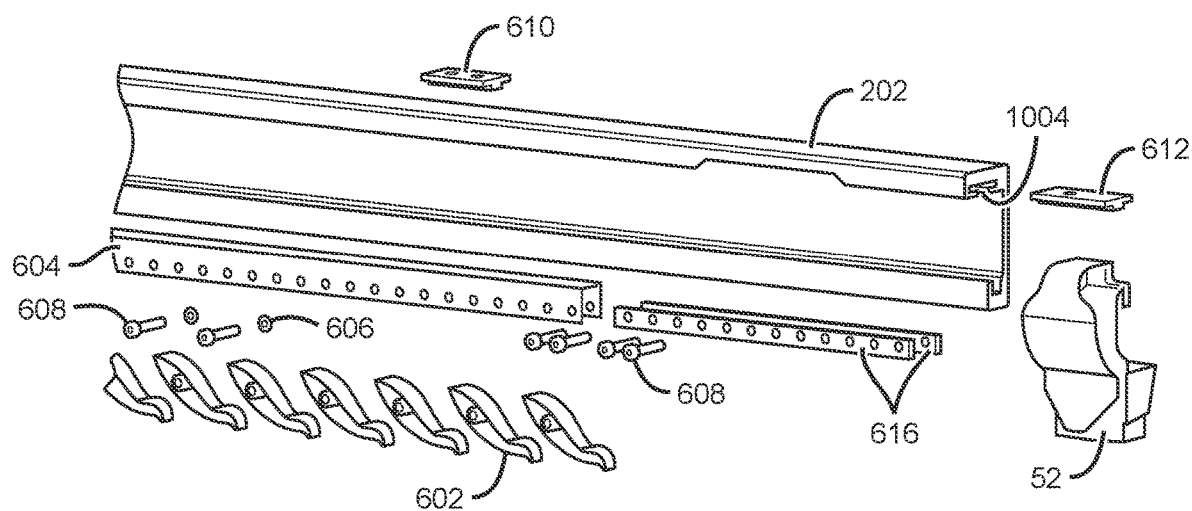
FIG. 6 is an exploded, perspective view of a portion of an example grow line and reciprocating cam mechanism.

As FIGS. 6 and 10 illustrate, the top section of the extrusion profile of grow line 202 contains a downward facing t-slot 1004. Linear guide carriages 610 (described below) ride within the t-slot 1004. The center portion of the t-slot 1004 may be recessed to provide clearance from screws or over-molded inserts which may protrude from the carriages 610. Each grow line 202 can be assembled from a number of separately fabricated sections. In one implementation, sections of grow line 202 are currently modeled in 6-meter lengths. Longer sections reduce the number of junctions but are more susceptible to thermal expansion issues and may significantly increase shipping costs. Additional features not captured by the Figures include intermittent mounting holes to attach the grow line 202 to the ceiling structure and to attach irrigation lines. Interruptions to the t-slot 1004 may also be machined into the conveyor body. These interruptions allow the linear guide carriages 610 to be removed without having to slide them all the way out the end of a grow line 202.

At the junction between two sections of a grow line 202, a block 612 may be located in the t-slots 1004 of both conveyor bodies. This block serves to align the two grow line sections so that grow towers 50 may slide smoothly between them. Alternative methods for aligning sections of a grow line 202 include the use of dowel pins that fit into dowel holes in the extrusion profile of the section. The block 612 may be clamped to one of the grow line sections via a set screw, so that the grow line sections can still come together and move apart as the result of thermal expansion. Based on the relatively tight tolerances and small amount of material required, these blocks may be machined. Bronze may be used as the material for such blocks due to its strength, corrosion resistance, and wear properties.

In one implementation, the vertical tower conveyance system 200 utilizes a reciprocating linear ratchet and pawl structure (hereinafter referred to as a "reciprocating cam structure or mechanism") to move grow towers 50 along a path section 202*a*, 202*b* of a grow line 202. In one implementation, each path section 202*a*, 202*b* includes a separate reciprocating cam structure and associated actuators. FIGS. 5A, 6 and 7 illustrate one possible reciprocating cam mechanism that can be used to move grow towers 50 across grow lines 202. Pawls or "cams" 602 physically push grow towers 50 along grow line 202. Cams 602 are attached to cam channel 604 (see below) and rotate about one axis. On the forward stroke, the rotation is limited by the top of the cam channel 604, causing the cams 602 to push grow towers 50 forward. On the reserve or back stroke, the rotation is unconstrained, thereby allowing the cams to ratchet over the top of the grow towers 50. In this way, the cam mechanism can stroke a relatively short distance back and forth, yet grow towers 50 always progress forward along the entire length of a grow line 202. A control system, in one implementation, controls the operation of the reciprocating cam mechanism of each grow line 202 to move the grow towers 50 according to a programmed growing sequence. In between movement cycles, the actuator and reciprocating cam mechanism remain idle.

The pivot point of the cams 602 and the means of attachment to the cam channel 604 consists of a binding post 606 and a hex head bolt 608; alternatively, detent clevis pins may be used. The hex head bolt 608 is positioned on the inner side of the cam channel 604 where there is no tool access in the axial direction. Being a hex head, it can be accessed radially with a wrench for removal. Given the large number of cams needed for a full-scale farm, a high-volume manufacturing process such as injection molding is suitable. ABS is suitable material given its stiffness and relatively low cost. All the cams 602 for a corresponding grow line 202 are attached to the cam channel 604. When connected to an actuator, this common beam structure allows all cams 602 to stroke back and forth in unison. The structure of the cam channel 604, in one implementation, is a downward facing u-channel constructed from sheet metal. Holes in the downward facing walls of cam channel 604 provide mounting points for cams 602 using binding posts 606.

Holes of the cam channel 604, in one implementation, are spaced at 12.7 mm intervals. Therefore, cams 602 can be spaced relative to one another at any integer multiple of 12.7 mm, allowing for variable grow tower spacing with only one cam channel. The base of the cam channel 604 limits rotation of the cams during the forward stroke. All degrees of freedom of the cam channel 604, except for translation in the axial direction, are constrained by linear guide carriages 610 (described below) which mount to the base of the cam channel 604 and ride in the t-slot 1004 of the grow line 202. Cam channel 604 may be assembled from separately formed sections, such as sections in 6-meter lengths. Longer sections reduce the number of junctions but may significantly increase shipping costs. Thermal expansion is generally not a concern because the cam channel is only fixed at the end connected to the actuator. Given the simple profile, thin wall thickness, and long length needed, sheet metal rolling is a suitable manufacturing process for the cam channel. Galvanized steel is a suitable material for this application.

Linear guide carriages 610 are bolted to the base of the cam channels 604 and ride within the t-slots 1004 of the grow lines 202. In some implementations, one carriage 610 is used per 6-meter section of cam channel. Carriages 610 may be injection molded plastic for low friction and wear resistance. Bolts attach the carriages 610 to the cam channel 604 by threading into over molded threaded inserts. If select cams 602 are removed, these bolts are accessible so that a section of cam channel 604 can be detached from the carriage and removed.

Sections of cam channel 604 are joined together with pairs of connectors 616 at each joint; alternatively, detent clevis pins may be used. Connectors 616 may be galvanized steel bars with machined holes at 20 mm spacing (the same hole spacing as the cam channel 604). Shoulder bolts 618 pass through holes in the outer connector, through the cam channel 604, and thread into holes in the inner connector. If the shoulder bolts fall in the same position as a cam 602, they can be used in place of a binding post. The heads of the shoulder bolts 618 are accessible so that connectors and sections of cam channel can be removed.

Figure 7A:
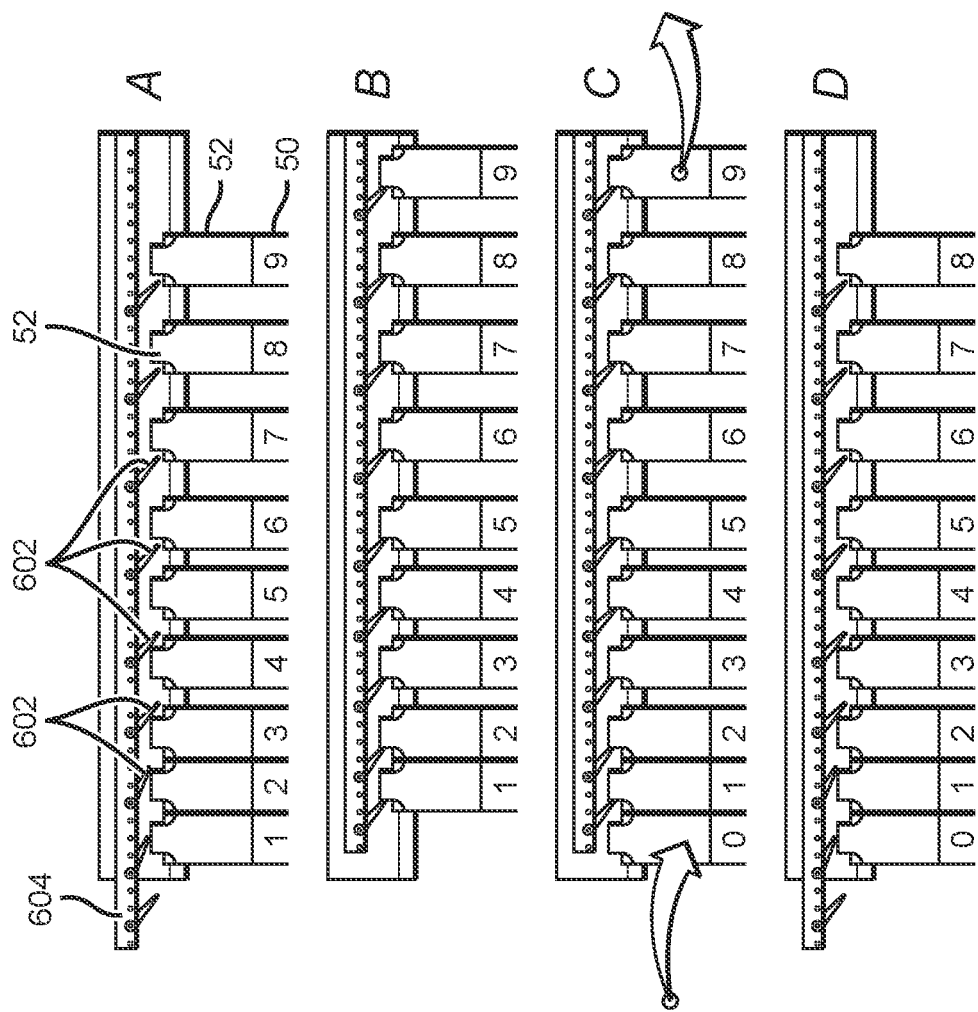
FIG. 7A is a sequence diagram illustrating operation of an example reciprocating cam mechanism.

In one implementation, cam channel 604 attaches to a linear actuator, which operates in a forward and a back stroke. A suitable linear actuator may be the T13-B4010MS053-62 actuator offered by Thomson, Inc. of Redford, Virginia; however, the reciprocating cam mechanism described herein can be operated with a variety of different actuators. The linear actuator may be attached to cam channel 604 at the off-loading end of a grow line 202, rather than the on-boarding end. In such a configuration, cam channel 604 is under tension when loaded by the towers 50 during a forward stroke of the actuator (which pulls the cam channel 604) which reduces risks of buckling. FIG. 7A illustrates operation of the reciprocating cam mechanism according to one implementation of the invention. In step A, the linear actuator has completed a full back stroke; as FIG. 7A illustrates, one or more cams 602 may ratchet over the hooks 52 of a grow tower 50. Step B of FIG. 7A illustrates the position of cam channel 604 and cams 602 at the end of a forward stroke. During the forward stroke, cams 602 engage corresponding grow towers 50 and move them in the forward direction along grow line 202 as shown. Step C of FIG. 7A illustrates how a new grow tower 50 (Tower 0) may be inserted onto a grow line 202 and how the last tower (Tower 9) may be removed. Step D illustrates how cams 602 ratchet over the grow towers during a back stroke, in the same manner as Step A. The basic principle of this reciprocating cam mechanism is that reciprocating motion from a relatively short stroke of the actuator transports towers 50 in one direction along the entire length of the grow line 202. More specifically, on the forward stroke, all grow towers 50 on a grow line 202 are pushed forward one position. On the back stroke, the cams 602 ratchet over an adjacent tower one position back; the grow towers remain in the same location. As shown, when a grow line 202 is full, a new grow tower may be loaded and a last tower unloaded after each forward stroke of the linear actuator. In some implementations, the top portion of the hook 52 (the portion on which the cams push), is slightly narrower than the width of a grow tower 50. As a result, cams 602 can still engage with the hooks 52 when grow towers 50 are spaced immediately adjacent to each other. FIG. 7A shows 9 grow towers for didactic purposes. A grow line 202 can be configured to be quite long (for example, 40 meters) allowing for a much greater number of towers 50 on a grow line 202 (such as 400-450). Other implementations are possible. For example, the minimum tower spacing can be set equal to or slightly greater than two times the side-to-side distance of a grow tower 50 to allow more than one grow tower 50 to be loaded onto a grow line 202 in each cycle.

Figure 7B:
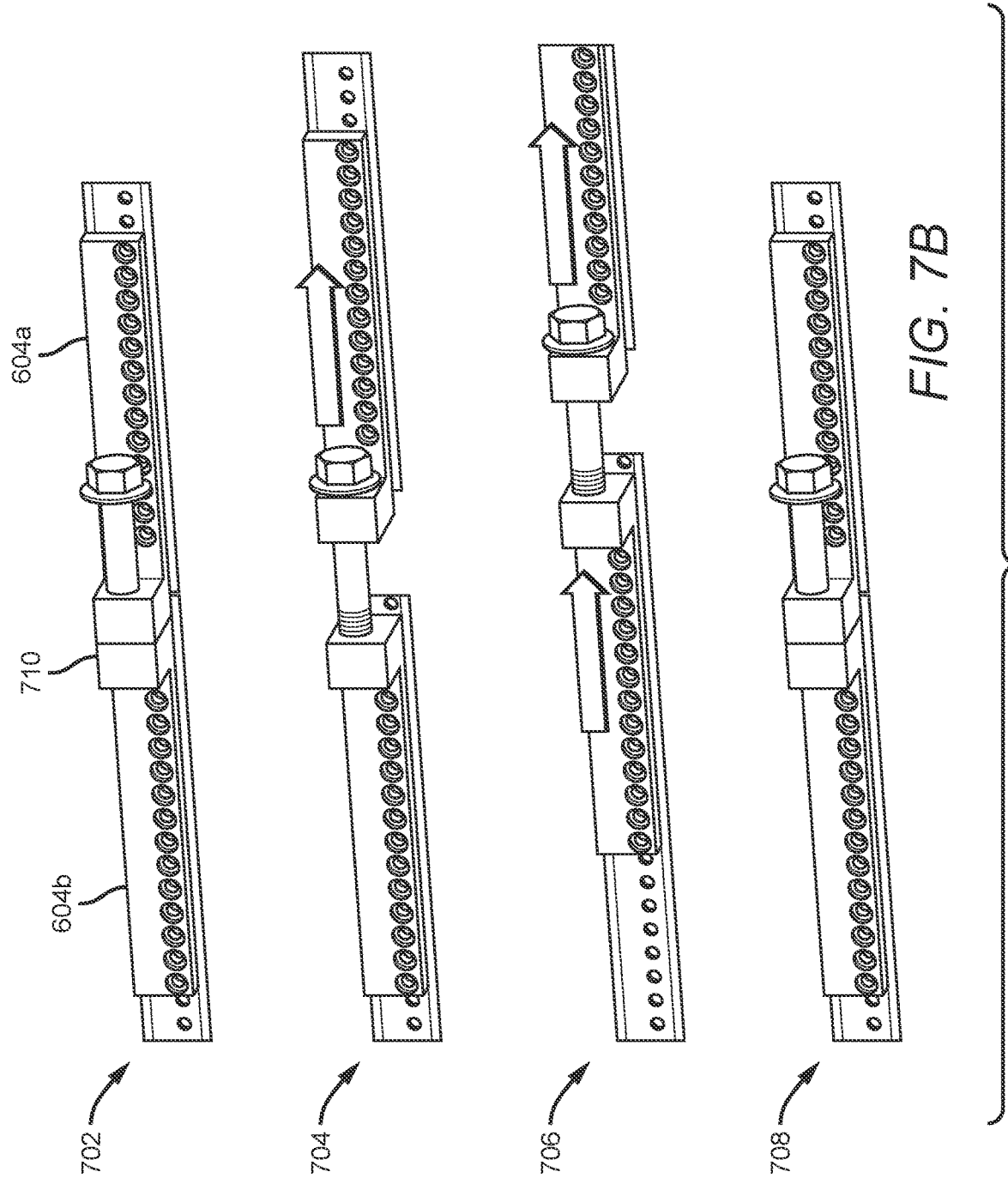
FIG. 7B illustrates an alternative cam channel including an expansion joint.

Still further, as shown in FIG. 7A, the spacing of cams 602 along the cam channel 604 can be arranged to effect one-dimensional plant indexing along the grow line 202. In other words, the cams 602 of the reciprocating cam mechanism can be configured such that spacing between towers 50 increases as they travel along a grow line 202. For example, spacing between cams 602 may gradually increase from a minimum spacing at the beginning of a grow line to a maximum spacing at the end of the grow line 202. This may be useful for spacing plants apart as they grow to increase light interception and provide spacing, and, through variable spacing or indexing, increasing efficient usage of the growth chamber 20 and associated components, such as lighting. In one implementation, the forward and back stroke distance of the linear actuator is equal to (or slightly greater than) the maximum tower spacing. During the back stroke of the linear actuator, cams 602 at the beginning of a grow line 202 may ratchet and overshoot a grow tower 50. On the forward stroke, such cams 602 may travel respective distances before engaging a tower, whereas cams located further along the grow line 202 may travel shorter distances before engaging a tower or engage substantially immediately. In such an arrangement, the maximum tower spacing cannot be two times greater than the minimum tower spacing; otherwise, a cam 602 may ratchet over and engaging two or more grow towers 50. If greater maximum tower spacing is desired, an expansion joint may be used, as illustrated in FIG. 7B. An expansion joint allows the leading section of the cam channel 604 to begin traveling before the trailing end of the cam channel 604, thereby achieving a long stroke. In particular, as FIG. 7B shows, expansion joint 710 may attach to sections 604a and 604b of cam channel 604. In the initial position (702), the expansion joint 710 is collapsed. At the beginning of a forward stroke (704), the leading section 604a of cam channel 604 moves forward (as the actuator pulls on cam channel 604), while the trailing section 604b remains stationary. Once the bolt bottoms out on the expansion joint 710 (706), the trailing section 604 of cam channel 604 begins to move forward as well. On the back stroke (708), the expansion joint 710 collapses to its initial position.

Other implementations for moving vertical grow towers 50 may be employed. For example, a lead screw mechanism may be employed. In such an implementation, the threads of the lead screw engage hooks 52 disposed on grow line 202 and move grow towers 50 as the shaft rotates. The pitch of the thread may be varied to achieve one-dimensional plant indexing. In another implementation, a belt conveyor include paddles along the belt may be employed to move grow towers 50 along a grow line 202. In such an implementation, a series of belt conveyors arranged along a grow line 202, where each belt conveyor includes a different spacing distance among the paddles to achieve one-dimensional plant indexing. In yet other implementations, a power-and-free conveyor may be employed to move grow towers 50 along a grow line 202. Still further, although the grow line 202 illustrated in the various figures is horizontal to the ground, the grow line 202 may be sloped at a slight angle, either downwardly or upwardly relative to the direction of tower travel.

Still further, while the grow line 202 described above operates to convey grow towers in a single direction, the grow line 202 may be configured to include multiple sections, where each section is oriented in a different direction. For example, two sections may be perpendicular to each other. In other implementations, the grow line 202 may have a u-shaped travel path where two sections may run parallel to each other, but have opposite directions of travel. In such an implementation, a return transfer mechanism can transfer grow towers 50 from the end of the first path to the beginning of the second path. In one implementation, for example, pneumatic actuators can be employed to move a carriage similar to carriage 1202 above along a track back and forth as required to perform the transfer operations described herein. Other return transfer mechanisms can also be employed. For example, the return transfer mechanism may comprise a swinging arm that engages a grow tower 50 at the offload end of first path section and swings 180 degrees to translate the grow tower 50 to the onload end of the return path section. In another implementation, the return transfer mechanism may include a semi-circular track section spanning the first and second path sections of grow line 202. In such an implementation, a wheel including paddles can push grow towers around the semi-circular track section with each movement cycle of the grow line 202.

Irrigation & Aqueous Nutrient Supply

FIG. 8 illustrates how an irrigation line 802 may be attached to grow line 202 to supply an aqueous nutrient solution to crops disposed in grow towers 50 as they translate through the vertical tower conveyance system 200. Irrigation line 802, in one implementation, is a pressurized line with spaced-apart holes disposed at the expected locations of the towers 50 as they advance along grow line 202 with each movement cycle. For example, the irrigation line 802 may be a PVC pipe having an inner diameter of 1.5 inches and holes having diameters of 0.125 inches. The irrigation line 802 may be approximately 40 meters in length spanning the entire length of a grow line 202. To ensure adequate pressure across the entire line, irrigation line 802 may be broken into shorter sections, each connected to a manifold, so that pressure drop is reduced.

Figure 11A:
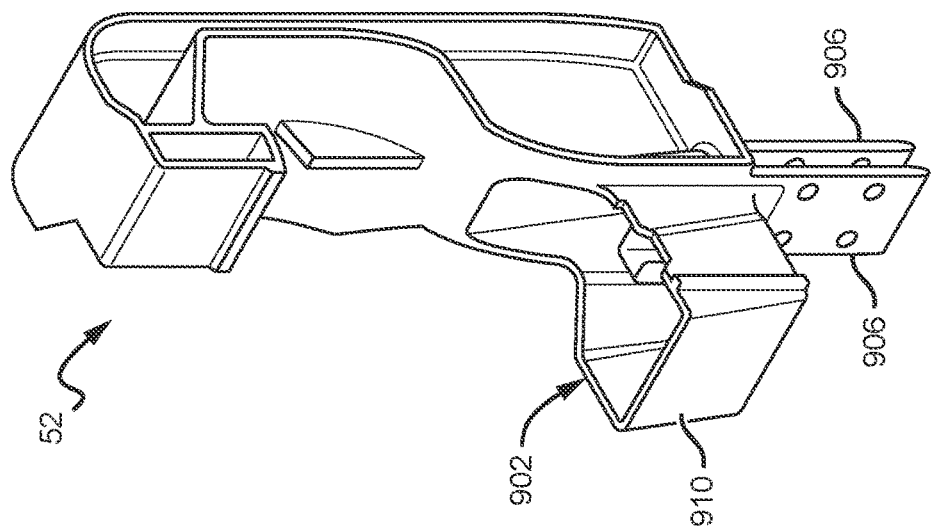
FIG. 11A is perspective view of an example tower hook and integrated funnel structure.

As FIG. 8 shows, a funnel structure 902 collects aqueous nutrient solution from irrigation line 802 and distributes the aqueous nutrient solution to the cavity(ies) 54a, 54b of the grow tower 50 as discussed in more detail below. FIGS. 9 and 11A illustrate that the funnel structure 902 may be integrated into hook 52. For example, the funnel structure 902 may include a collector 910, first and second passageways 912 and first and second slots 920. As FIG. 9 illustrates, the groove-engaging member 58 of the hook may disposed at a centerline of the overall hook structure. The funnel structure 902 may include flange sections 906 extending downwardly opposite the collector 910 and on opposing sides of the centerline. The outlets of the first and second passageways are oriented substantially adjacent to and at opposing sides of the flange sections 906, as shown. Flange sections 906 register with central wall 56 of grow tower 50 to center the hook 52 and provides additional sites to adhere or otherwise attach hook 52 to grow tower 50. In other words, when hook 52 is inserted into the top of grow tower 50, central wall 56 is disposed between flange sections 906. In the implementation shown, collector 910 extends laterally from the main body 53 of hook 52.

Figure 11B:
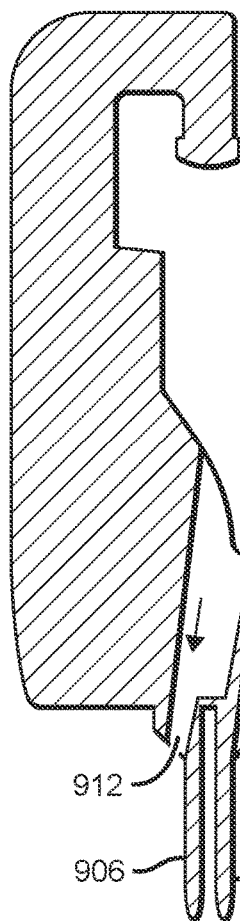
FIG. 11B is a section view of an example tower hook and integrated funnel structure.
Figure 11C:
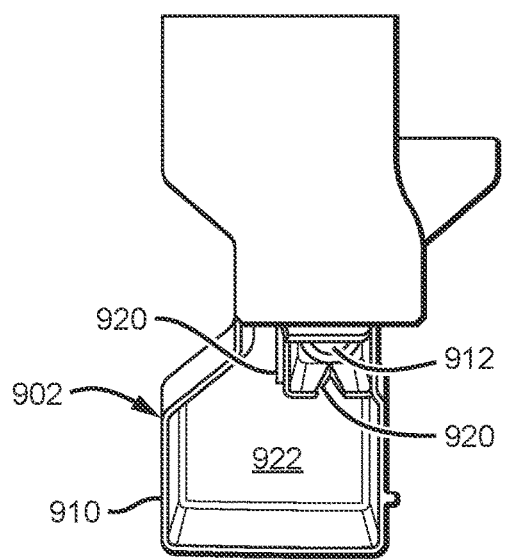
FIG. 11C is a top view of an example tower hook and integrated funnel structure.

As FIG. 11B shows, funnel structure 902 includes a collector 910 that collects nutrient fluid and distributes the fluid evenly to the inner cavities 54a and 54b of tower through passageways 912. Passageways 912 are configured to distribute aqueous nutrient solution near the central wall 56 and to the center back of each cavity 54a, 54b over the ends of the plug holders 158 and where the roots of a planted crop are expected. As FIG. 11C illustrates, in one implementation, the funnel structure 902 includes slots 920 that promote the even distribution of nutrient fluid to both passageways 912. For nutrient fluid to reach passageways 912, it must flow through one of the slots 920. Each slot 920 may have a V-like configuration where the width of the slot opening increases as it extends from the substantially flat bottom surface 922 of collector 910. For example, each slot 920 may have a width of 1 millimeter at the bottom surface 922. The width of slot 920 may increase to 5 millimeters over a height of 25 millimeters. The configuration of the slots 920 causes nutrient fluid supplied at a sufficient flow rate by irrigation line 802 to accumulate in collector 910, as opposed to flowing directly to a particular passageway 912, and flow through slots 920 to promote even distribution of nutrient fluid to both passageways 912.

In operation, irrigation line 802 provides aqueous nutrient solution to funnel structure 902 that even distributes the water to respective cavities 54a, 54b of grow tower 50. The aqueous nutrient solution supplied from the funnel structure 902 irrigates crops contained in respective plug containers 158 as it trickles down. In one implementation, a gutter disposed under each grow line 202 collects excess water from the grow towers 50 for recycling.

Other implementations are possible. For example, the funnel structure may be configured with two separate collectors that operate separately to distribute aqueous nutrient solution to a corresponding cavity 54a, 54b of a grow tower 50. In such a configuration, the irrigation supply line can be configured with one hole for each collector. In other implementations, the towers may only include a single cavity and include plug containers only on a single face 101 of the towers. Such a configuration still calls for a use of a funnel structure that directs aqueous nutrient solution to a desired portion of the tower cavity, but obviates the need for separate collectors or other structures facilitating even distribution.

Automated Pickup & Laydown Stations

As discussed above, the stations of central processing system 30 operate on grow towers 50 in a horizontal orientation, while the vertical tower conveyance system 200 conveys grow towers in the growth environment 20 in a vertical orientation. In one implementation, an automated pickup station 43, and associated control logic, may be operative to releasably grasp a horizontal grow tower from a loading location, rotate the tower to a vertical orientation and attach the tower to a transfer station for insertion into a selected grow line 202 of the growth environment 20. On the other end of growth environment 20, automated laydown station 41, and associated control logic, may be operative to releasably grasp and move a vertically-oriented grow tower 50 from a buffer location, rotate the grow tower 50 to a horizontal orientation and place it on a conveyance system for processing by one or more stations of central processing system 30. For example, automated laydown station 41 may place grow towers 50 on a conveyance system for loading into harvester station 32. The automated laydown station 41 and pickup station 43 may each comprise a six-degrees of freedom (six axes) robotic arm, such as a FANUC robot. The stations 41 and 43 may also include end effectors for releasably grasping grow towers 50 at opposing ends.

Figure 14:
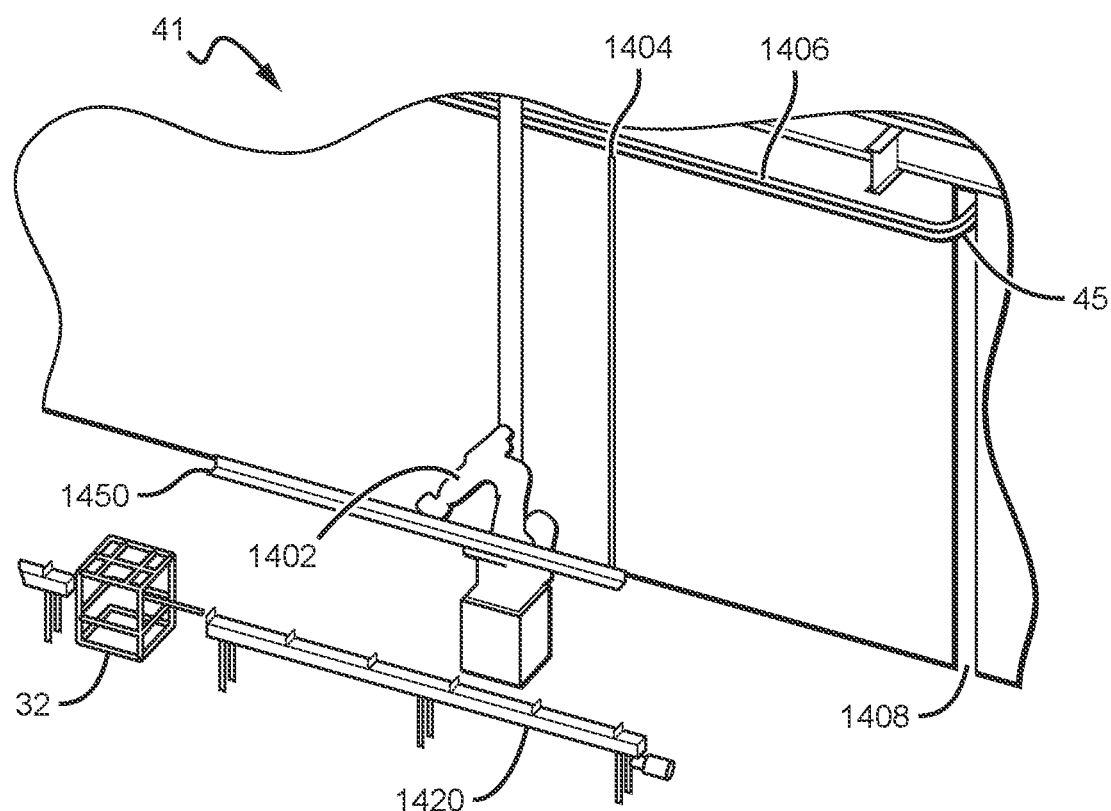
FIG. 14 is a partial perspective view of an example automated laydown station.

FIG. 14 illustrates an automated laydown station 41 according to one implementation of the invention. As shown, automated laydown station 41 includes robot 1402 and end effector 1450. Unload transfer conveyance mechanism 45, which may be a power and free conveyor, delivers grow towers 50 from growth environment 20. In one implementation, the buffer track section 1406 of unload transfer conveyance mechanism 45 extends through a vertical slot 1408 in growth environment 20, allowing mechanism 45 to convey grow towers 50 attached to carriages 1202 outside of growth environment 20 and towards pick location 1404. Unload transfer conveyance mechanism 45 may use a controlled stop blade to stop the carriage 1202 at the pick location 1404. The unload transfer conveyance mechanism 45 may include an anti-roll back mechanism, bounding the carriage 1202 between the stop blade and the anti-roll back mechanism.

As FIG. 12 illustrates, receiver 1204 may be attached to a swivel mechanism 1210 allowing rotation of grow towers 50 when attached to carriages 1202 for closer buffering in unload transfer conveyance mechanism 45 and/or to facilitate the correct orientation for loading or unloading grow towers 50. In some implementations, for the laydown location and pick location 1404, grow towers 50 may be oriented such that hook 52 faces away from the automated laydown and pickup stations 41, 43 for ease of transferring towers on/off the swiveled carriage receiver 1204. Hook 52 may rest in a groove in the receiver 1204 of carriage 1202. Receiver 1204 may also have a latch 1206 which closes down on either side of the grow tower 50 to prevent a grow tower 50 from sliding off during acceleration or deceleration associated with transfer conveyance.

FIG. 16 illustrates an end effector 1450, according to one implementation of the invention, that provides a pneumatic gripping solution for releasably grasping a grow tower 50 at opposing ends. End effector 1450 may include a beam 1602 and a mounting plate 1610 for attachment to a robot, such as robotic arm 1402. A top gripper assembly 1604 and a bottom gripper assembly 1606 are attached to opposite ends of beam 1602. End effector 1450 may also include support arms 1608 to support a grow tower 50 when held in a horizontal orientation. For example, support arms 1608 extending from a central section of beam 1602 mitigate tower deflection. Support arms 1608 may be spaced ~1.6 meters from either gripper assembly 1604, 1606, and may be nominally 30 mm offset from a tower face, allowing 30 mm of tower deflection before the support arms 1608 catch the tower.

Figure 17B:
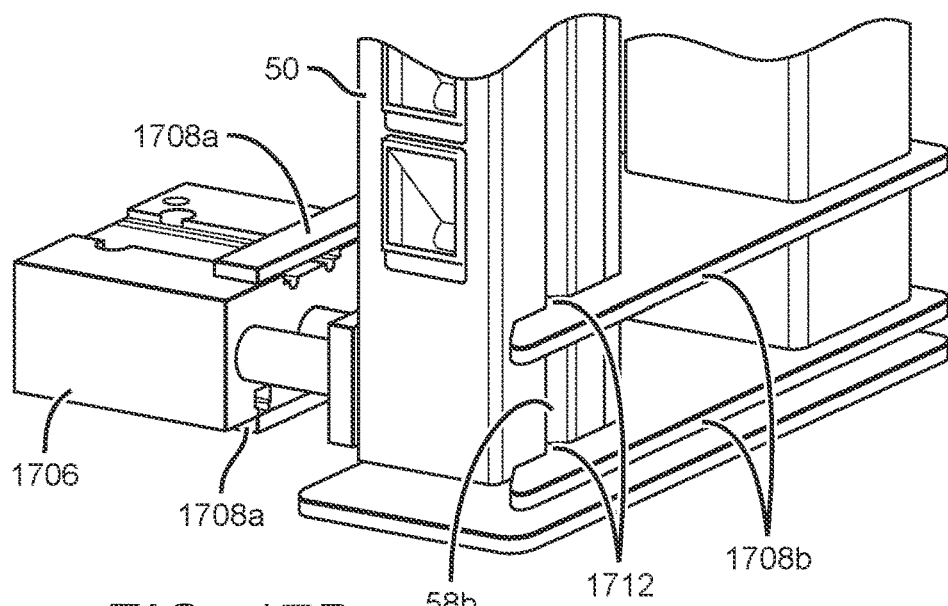

Bottom gripper assembly 1606, as shown in FIGS. 17A and 17B, may include plates 1702 extending perpendicularly from an end of beam 1602 and each having a cut-out section 1704 defining arms 1708a and 1708b. A pneumatic cylinder mechanism 1706, such as a guided pneumatic cylinder sold by SMC Pneumatics under the designation MGPM40-40Z, attaches to arms 1708a of plates 1702. Arms 1708b may include projections 1712 that engage groove 58b of grow tower 50 when grasped therein to locate the grow tower 50 in the gripper assembly 1606 and/or to prevent slippage. The gripper assembly 1606, in the implementation shown, operates like a lobster claw—i.e., one side of the gripper (the pneumatic cylinder mechanism 1706) moves, while the other side (arms 1708b) remain static. On the static side of the gripper assembly 1606, the pneumatic cylinder mechanism 1706 drives the grow tower 50 into the arms 1708, registering the tower 50 with projections 1712. Friction between a grow tower 50 and arms 1708b and pneumatic cylinder mechanism 1706 holds the tower 50 in place during operation of an automated laydown or pick up station 41, 43. To grasp a grow tower 50, the pneumatic cylinder mechanism 1706 may extend. In such an implementation, pneumatic cylinder mechanism 1706 is retracted to a release position during a transfer operation involving the grow towers 50. In one implementation, the solenoid of pneumatic cylinder mechanism 1706 is center-closed in that, whether extended or retracted, the valve locks even if air pressure is lost. In such an implementation, loss of air pressure will not cause a grow tower 50 to fall out of end effector 1450 while the pneumatic cylinder mechanism 1706 is extended.

Top gripper assembly 1604, in one implementation, is essentially a mirror image of bottom gripper assembly 1606, as it includes the same components and operates in the same manner described above. Catch plate 1718, in one implementation, may attach only to bottom gripper assembly 1606. Catch plate 1718 may act as a safety catch in case the gripper assemblies fail or the grow tower 50 slips. Other implementations are possible. For example, the gripper assemblies may be parallel gripper assemblies where both opposing arms of each gripper move when actuated to grasp a grow tower 50.

Figure 18:
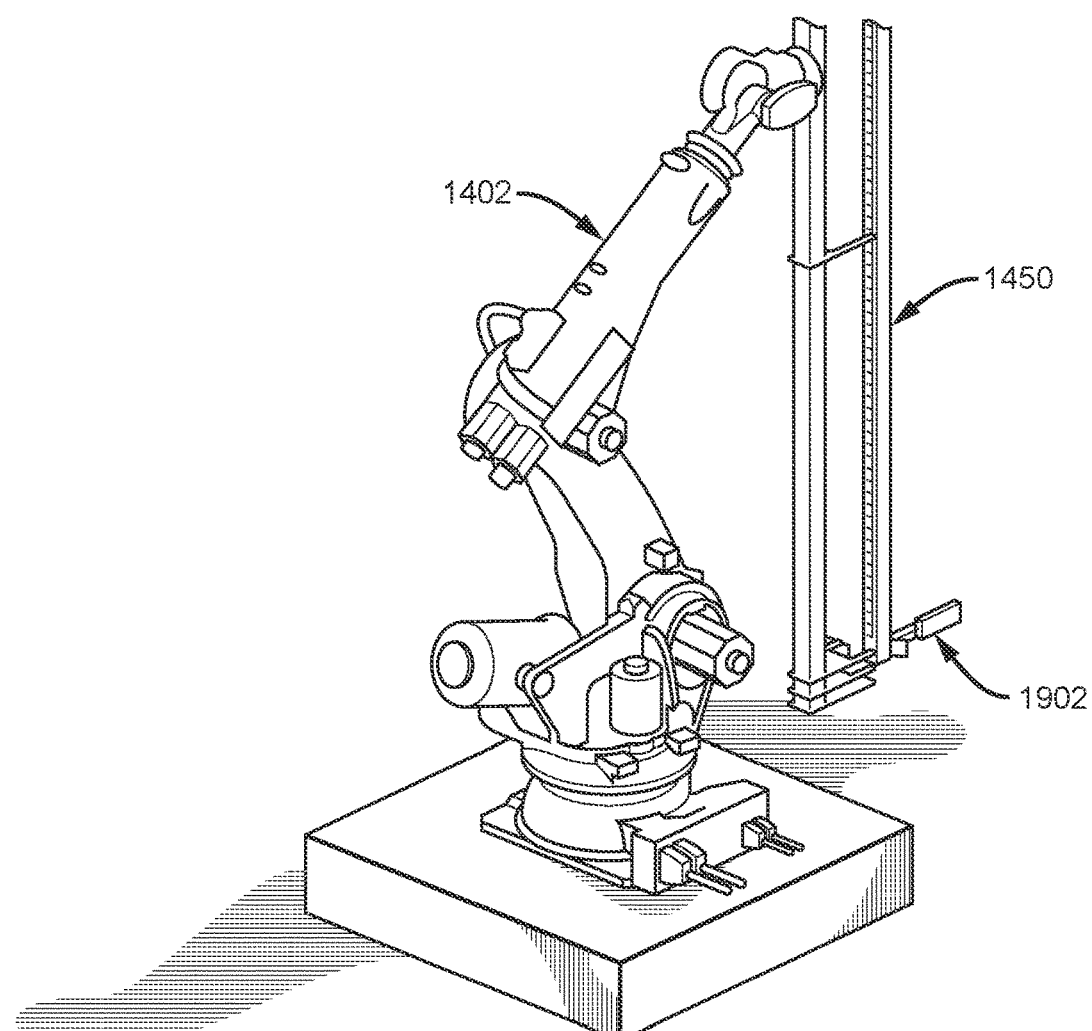
FIG. 18 is a partial perspective view of the example automated pickup station.

Robot 1402 may be a 6-axis robotic arm including a base, a lower arm attached to the base, an upper arm attached to the lower arm, and a wrist mechanism disposed between the end of the upper arm and an end effector 1450. For example, robot 1402 may 1) rotate about its base; 2) rotate a lower arm to extend forward and backward; 3) rotate an upper arm, relative to the lower arm, upward and downward; 4) rotate the upper arm and attached wrist mechanism in a circular motion; 5) tilt a wrist mechanism attached to the end of the upper arm up and down; and/or 6) rotate the wrist mechanism clockwise or counter-clockwise. However, modifications to end effector 1450 (and/or other elements, such as conveyance mechanisms and the like) may permit different types of robots and mechanisms, as well as use of robots with fewer axes of movement. As FIG. 18 illustrates, robot 1402 may be floor mounted and installed on a pedestal. Inputs to the robot 1402 may include power, a data connection to a control system, and an air line connecting the pneumatic cylinder mechanism 1706 to a pressurized air supply. On pneumatic cylinder mechanism 1706, sensors may be used to detect when the cylinder is in its open state or its closed state. The control system may execute one or more programs or sub-routines to control operation of the robot 1402 to effect conveyance of grow towers 50 from growth environment 20 to central processing system 20.

Figure 19:
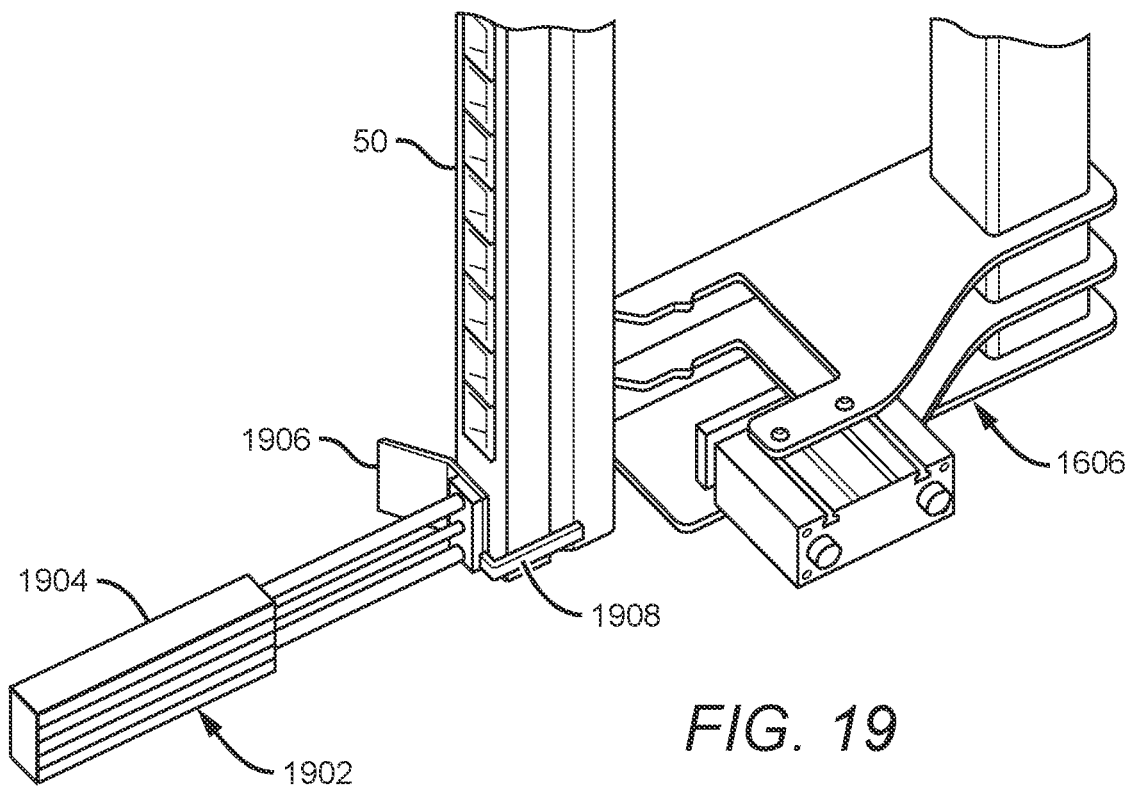
FIG. 19 is partial perspective view of the example automated pickup station that illustrates an example constraining mechanism that facilitates location of grow towers.

When a grow tower 50 accelerates/decelerates in unload transfer conveyance mechanism 45, the grow tower 50 may swing slightly. FIGS. 18 and 19 illustrate a tower constraining mechanism 1902 to stop possible swinging, and to accurately locate, a grow tower 50 during a laydown operation of automated laydown station 41. In the implementation shown, mechanism 1902 is a floor-mounted unit that includes a guided pneumatic cylinder 1904 and a bracket assembly including a guide plate 1906 that guides a tower 50 and a bracket arm 1908 that catches the bottom of the grow tower 50, holding it at a slight angle to better enable registration of the grow tower 50 to the bottom gripper assembly 1606. A control system may control operation of mechanism 1902 to engage the bottom of a grow tower 50, thereby holding it in place for gripper assembly 1606.

The end state of the laydown operation is to have a grow tower 50 laying on the projections 2004 of the harvester infeed conveyor 1420, as centered as possible. In one implementation, a grow tower 50 is oriented such that hook 52 points towards harvester station 32 and, in implementations having hinged side walls, and hinge side down. The following summarizes the decisional steps that a controller for robot 1402 may execute during a laydown operation, according to one possible implementation of the invention.

Laydown Procedure Description

The Main program for the robot controller may work as follows:

A control system associated with central processing system 30 may activate the robot controller's Main program.

Within the Main program, the robot controller may check if robot 1402 is in its home position.

If robot 1402 is not in its home position, it enters its Home program to move to the home position.

The Main program then calls the reset I/O program to reset all the I/O parameters on robot 1402 to default values.

Next, the Main program runs the handshake program with the central processing controller to make sure a grow tower 50 is present at the pickup location 1404 and ready to be picked up.

The Main program may run an enter zone program to indicate it is about to enter the transfer conveyance zone.

The Main program may run a Pick Tower program to grasp a grow tower 50 and lift it off of carriage 1202.

The Main program may then call the exit zone program to indicate it has left the transfer conveyance zone.

Next the Main program runs the handshake program with the central processing controller to check whether the harvester infeed conveyor 1420 is clear and in position to receive a grow tower 50.

The Main program may then run the enter zone program to indicate it is about to enter the harvester infeed conveyor zone.

The Main program runs a Place Tower program to move and place the picked tower onto the infeed conveyor 1420.

The Main program then calls an exit zone program to indicate it has left the harvester infeed conveyor zone.

The Home program may then run to return robot 1402 to its home position.

Lastly, the Main program may run the handshake program with the central processing controller to indicate robot 1402 has returned to its home position and is ready to pick the next grow tower 50.

The Pick Tower program may work as follows:

Robot 1402 checks to make sure the grippers 1604, 1606 are in the open position. If the grippers are not open, robot 1402 will throw an alarm.

Robot 1402 may then begin to move straight ahead which will push the end effector 1450 into the tower face so that the grow tower is fully seated against the back wall of the grippers 1604, 1606.

Robot 1402 may then move sideways to push the rigid fingers 1712 against the tower walls to engage groove 58b.

Robot 1402 may activate robot outputs to close the grippers 1604, 1606.

Robot 1402 may wait until sensors indicate that the grippers 1604, 1606 are closed. If robot 1402 waits too long, robot 1402 may throw an alarm.

Once grip is confirmed, robot 1402 may then move vertically to lift grow tower 50 off of the receiver 1204.

Next, robot 1402 may then pull back away from pick location 1404.

The Place Tower program may work as follows:

Robot 1402 may move through two waypoints that act as intermediary points to properly align grow tower 50 during the motion.

Robot 1402 continues on to position end effector 1450 and grow tower 50 just above the center of the harvester in-feed conveyor 1450, such that the tower is in the correct orientation (e.g., hinge down on the rigid fingers, hook 52 towards harvester station 32).

Once the conveyor position is confirmed, robot 1402 may then activate the outputs to open grippers 1604, 1606 so that grow tower 50 is just resting on the rigid fingers 1712 and support arms 1608.

Robot 1402 may wait until the sensors indicate that grippers 1604, 1606 have opened. If robot 1402 waits too long, robot 1402 may throw an alarm.

After grippers 1604, 1606 are released, robot 1402 may then move vertically down. On the way down the projections 2004 of harvester infeed conveyor 1420 take the weight of grow tower 50 and the rigid fingers 1712 and support arms 1608 of end effector 1450 end up under grow tower and not in contact.

Lastly, robot 1402 may then pull end effector 1450 towards robot 1402, away from harvester infeed conveyor 1420, and slides rigid fingers 1712 of end effector 1450 out from under grow tower 50.

Figure 15A:
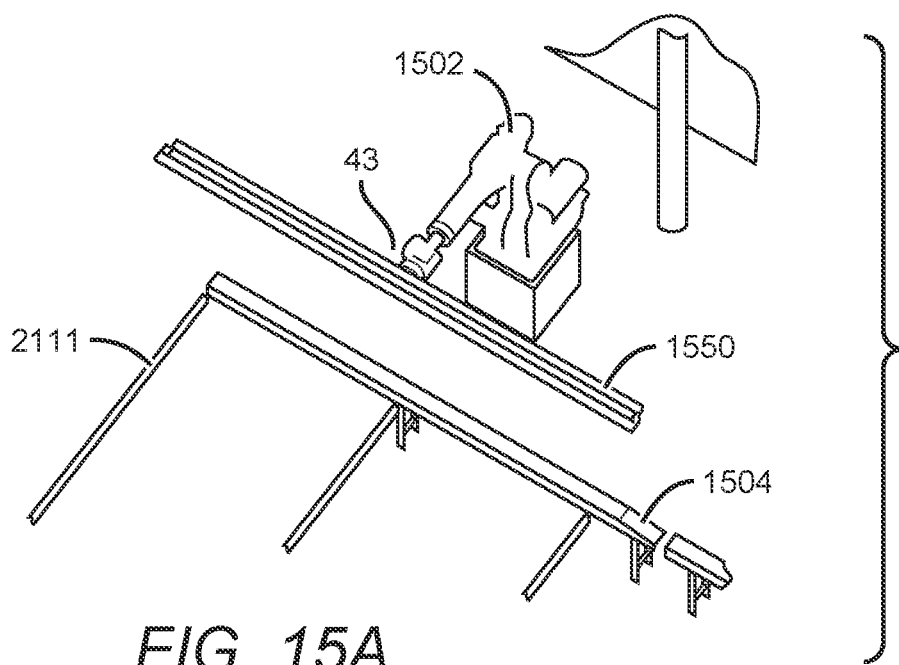
FIG. 15A is a partial perspective view of an example automated pickup station; and, FIG. 15B is an alternative partial perspective view of the example automated pickup station.

FIGS. 15A and 15B illustrate an automated pickup station 43 according to one implementation of the invention. As shown, automated pickup station 43 includes robot 1502 and pickup conveyor 1504. Similar to automated laydown station 41, robot 1502 includes end effector 1550 for releasably grasping grow towers 50. In one implementation, end effector 1550 is substantially the same as end effector 1450 attached to robot 1402 of automated laydown station 41. In one implementation, end effector 1550 may omit support arms 1608. As described herein, robot 1502, using end effector 1550, may grasp a grow tower 50 resting on pickup conveyor 1504, rotate the grow tower 50 to a vertical orientation and attach the grow tower 50 to a carriage 1202 of loading transfer conveyance mechanism 47. As discussed above, loading transfer conveyance mechanism 47, which may include be a power and free conveyor, delivers grow towers 50 to growth environment 20. In one implementation, the buffer track section 1522 of loading transfer conveyance mechanism 47 extends through a vertical slot in growth environment 20, allowing mechanism 47 to convey grow towers 50 attached to carriages 1202 into growth environment 20 from stop location 1520. Loading transfer conveyance mechanism 47 may use a controlled stop blade to stop the carriage 1202 at the stop location 1520. The loading transfer conveyance mechanism 47 may include an anti-roll back mechanism, bounding the carriage 1202 between the stop blade and the anti-roll back mechanism.

The following summarizes the decisional steps that a controller for robot 1502 may execute during a pickup operation, according to one possible implementation of the invention.

Pickup Procedure Description

The Main program for the robot controller may work as follows for robot 1502:

The central processing controller may activate the Main program.

Within the Main program, robot 1502 controller will check if robot 1502 is in its home position.

If robot 1502 is not in its home position, robot 1502 will enter its home program to move to the home position of the robot 1502.

The Main program may then call the reset 10 program to reset I/O values on robot 1502 to their default values.

Next, the Main program may run the handshake program with the central processing controller to request a decision code indicating which station (pickup conveyor 1504 or the transplanter transfer conveyor 2111) has a grow tower 50 ready for pickup.

The Main program may run the enter zone program to indicate it is about to enter the pickup location based on the decision code from above.

The Main program may then run the Pick Tower program to grab a tower and lift it from the specified conveyor based on the decision code from above.

The Main program may then call the exit zone program to indicate it has left the pickup location based on the decision code from above.

Next the Main program may run the handshake program with the central processing controller to check whether loading transfer conveyance mechanism 47 has a carriage 1202 in place and is ready to receive a grow tower 50.

The Main program may then run the enter zone program to indicate it is about to enter the transfer conveyance zone.

The Main program may run the Place Tower program to move and place the picked grow tower onto receiver 1204 of carriage 1202.

The Main program may then call the exit zone program to indicate it has left the transfer conveyance zone.

Robot 1502 then run the go to Home program to return robot 1502 to its home position.

Lastly, the Main program may run the handshake program with the central processing controller to indicate robot 1502 has returned to its home position and is ready to pick up the next grow tower 50.

The Pick Tower program may work as follows:

Robot 1502 may check to make sure the grippers are in the open position. If they are not open, robot 1502 will throw an alarm.

If the decision location resolves to the transplanter transfer conveyor 2111, robot 1502 will move vertically to align with the grow tower 50 on the transplanter transfer conveyor 2111.

Robot 1502 may then begin to move straight ahead to push end effector 1550 into the tower face so that the grow tower 50 is fully seated against the back wall of the grippers.

Robot 1502 moves upwards to lift grow tower 50 to rest the tower on the rigid fingers of the grippers.

Robot 1502 may then activate robot 1502 outputs to close the grippers.

Robot 1502 may wait until the sensors indicate that the grippers are closed. If robot 1502 waits too long, robot 1502 will throw an alarm.

Once grip is confirmed, robot 1502 moves vertically and pulls back away from the pickup conveyor 1504 or the transplanter transfer conveyor 2111.

The Place Tower program may work as follows:

Robot 1502 may move through two waypoints that act as intermediary points to properly align grow tower 50 during the motion.

Robot 1502 continues on to position end effector 1550 and grow tower 50 in line with receiver 1204 of carriage 1202.

Robot 1502 may then move forward to point 1520 which will position the tower hook 52 above the channel in receiver 1204.

Robot 1502 may then move down which will position the tower hook 52 to be slightly above (e.g., ~10 millimeters) above the channel of receiver 1204.

Robot 1502 may activate the outputs to open the grippers so that the hook 52 of tower 50 falls into the channel of receiver 1204.

Robot 1502 may wait until the sensors indicate that the grippers have opened. If robot 1502 waits too long, robot 1502 will throw an alarm.

Once the grippers are released, robot 1502 may move straight back away from the tower.

Central Processing System

As discussed above, central processing system 30 may include harvester station 32, washing station 34 and transplanter station 36. Central processing system 30 may also include one or more conveyors to transfer towers to or from a given station. For example, central processing system 30 may include harvester outfeed conveyor 2102, washer infeed conveyor 2104, washer outfeed conveyor 2106, transplanter infeed conveyor 2108, and transplanter outfeed conveyor 2110. These conveyors can be belt or roller conveyors adapted to convey grow towers 50 laying horizontally thereon. As described herein, central processing system 30 may also include one or more sensors for identifying grow towers 50 and one or more controllers for coordinating and controlling the operation of various stations and conveyors.

Figure 20:
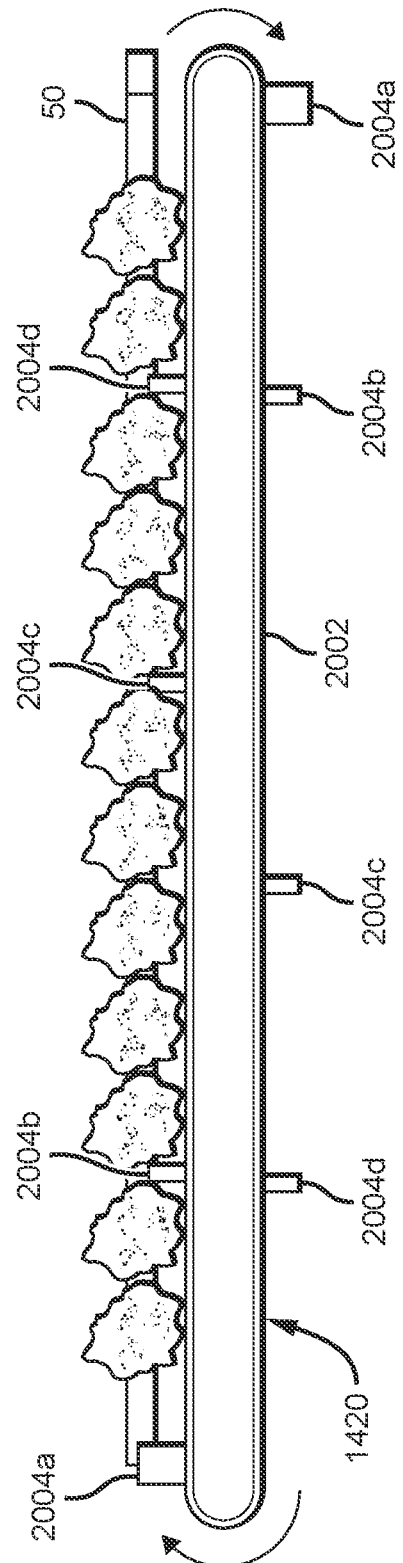
FIG. 20 is a side view of an example inbound harvester conveyor.
Figure 21A:
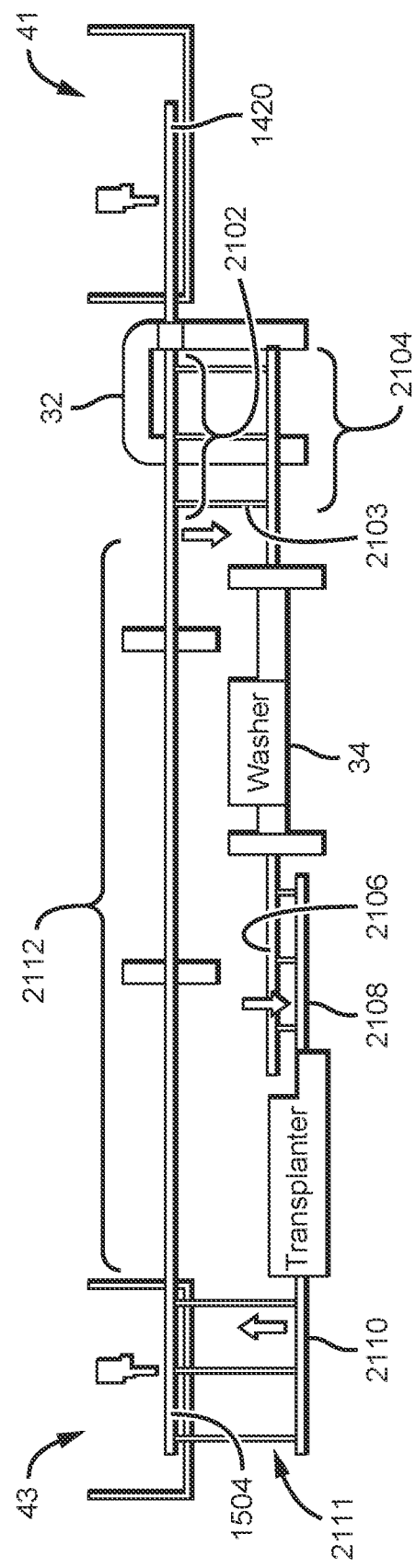
FIG. 21A is a functional block diagram of the stations and conveyance mechanisms of an example central processing system.

FIG. 21A illustrates an example processing pathway for central processing system 30. In one implementation, the stations of central processing system 30 are arranged in a substantially linear manner running parallel to grow lines 202 of growth environment. In other implementations, the grow lines 202 may run perpendicular to the processing path flow of central processing system 30. As discussed above, a robotic picking station 41 may lower a grow tower 50 with mature crops onto a harvester infeed conveyor 1420, which conveys the grow tower 50 to harvester station 32. FIG. 20 illustrates a harvester infeed conveyor 1420 according to one implementation of the invention. Harvester infeed conveyor 1420 may be a belt conveyor having a belt 2002 including projections 2004 extending outwardly from belt 2002. Projections 2004 provide for a gap between belt 2002 and crops extending from grow tower 50, helping to avoid or reduce damage to the crops. In one implementation, the size the projections 2004 can be varied cyclically at lengths of grow tower 50. For example, projection 2004a may be configured to engage the end of grow tower 50; top projection 2004d may engage the opposite end of grow tower 50; and middle projections 2004b, c may be positioned to contact grow tower 50 at a lateral face where the length of projections 2004b, c are lower and engage grow tower 50 when the tower deflects beyond a threshold amount. The length of belt 2002, as shown in FIG. 20 can be configured to provide for two movement cycles for a grow tower 50 for each full travel cycle of the belt 2002. In other implementations, however, all projections 2004 are uniform in length.

Figure 22:
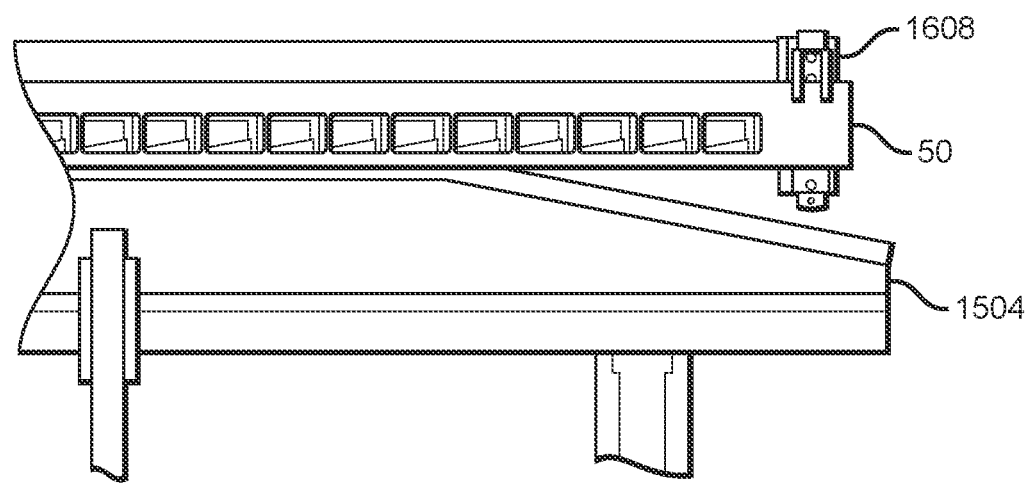
FIG. 22 is a partial perspective view of an example pickup conveyor.

As FIG. 21A shows, harvester outfeed conveyor 2102 conveys grow towers 50 that are processed from harvester station 32. In the implementation shown, central processing system 30 is configured to handle two types of grow towers: "cut-again" and "final cut." As used herein, a "cut-again" tower refers to a grow tower 50 that has been processed by harvester station 32 (i.e., the crops have been harvested from the plants growing in the grow tower 50, but the root structure of the plant(s) remain in place) and is to be re-inserted in growth environment 20 for crops to grow again. As used herein, a "final cut" tower refers to a grow tower 50 where the crops are harvested and where the grow tower 50 is to be cleared of root structure and growth medium and re-planted. Cut-again and final cut grow towers 50 may take different processing paths through central processing system 30. To facilitate routing of grow towers 50, central processing system 30 includes sensors (e.g., RFID, barcode, or infrared) at various locations to track grow towers 50. Control logic implemented by a controller of central processing system 30 tracks whether a given grow tower 50 is a cut-again or final cut grow tower and causes the various conveyors to route such grow towers accordingly. For example, sensors may be located at pick position 1404 and/or harvester infeed conveyor 1420, as well as at other locations. The various conveyors described herein can be controlled to route identified grow towers 50 along different processing paths of central processing system 30. As shown in FIG. 21A, a cut-again conveyor 2112 transports a cut-again grow tower 50 toward the work envelope of automated pickup station 43 for insertion into grow environment 20. Cut-again conveyor 2112 may consist of either a single accumulating conveyor or a series of conveyors. Cut-again conveyor 2112 may convey a grow tower 50 to pickup conveyor 1504. In one implementation, pickup conveyor 1504 is configured to accommodate end effector 1450 of automated pickup station 43 that reaches under grow tower 50. Methods of accommodating the end effector 1450 include either using a conveyor section that is shorter than grow tower 50 or using a conveyor angled at both ends as shown in FIG. 22.

Final cut grow towers 50, on the other hand, travel through harvester station 32, washing station 34 and transplanter 36 before reentering growth environment 20. With reference to FIG. 21A, a harvested grow tower 50 may be transferred from harvester outfeed conveyor 2102 to a washer transfer conveyor 2103. The washer transfer conveyor 2103 moves the grow tower onto washer infeed conveyor 2104, which feeds grow tower 50 to washing station 34. In one implementation, pneumatic slides may push a grow tower 50 from harvester outfeed conveyor 2102 to washer transfer conveyor 2103. Washer transfer conveyor 2103 may be a three-strand conveyor that transfers the tow to washer infeed conveyor 2104. Additional pusher cylinders may push the grow tower 50 off washer transfer conveyor 2103 and onto washer infeed conveyor 2104. A grow tower 50 exits washing station 34 on washer outfeed conveyor 2106 and, by way of a push mechanism, is transferred to transplanter infeed conveyor 2108. The cleaned grow tower 50 is then processed in transplanter station 36, which inserts seedlings into grow sites 53 of the grow tower. Transplanter outfeed conveyor 2110 transfers the grow tower 50 to final transfer conveyor 2111, which conveys the grow tower 50 to the work envelope of automated pickup station 43.

Figure 23A:
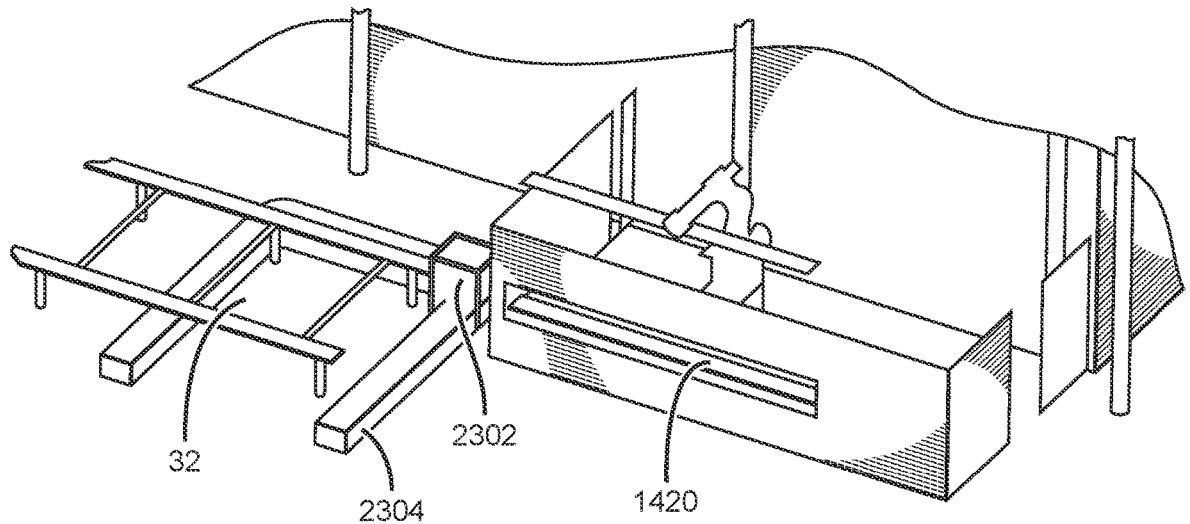
FIG. 23A is a perspective view of an example harvester station.

In the implementation shown in FIG. 23A, harvester station 34 comprises crop harvester machine 2302 and bin conveyor 2304. Harvester machine 2302 may include a rigid frame to which various components, such as cutters and feed assemblies, are mounted. Harvester machine 2302, in one implementation, includes its own feeder mechanism that engages a grow tower 50 and feeds it through the machine. In one implementation, harvester machine 2302 engages a grow tower on the faces that do not include grow sites 53 and may employ a mechanism that registers with grooves 58a, 58b to accurately locate the grow tower and grow sites 53 relative to harvesting blades or other actuators. In one implementation, harvester machine 2302 includes a first set of rotating blades that are oriented near a first face 101 of a grow tower 50 and a second set of rotating blades on an opposing face 101 of the grow tower 50. As the grow tower 50 is fed through the harvester machine 2302, crop extending from the grow sites 53 is cut or otherwise removed, where it falls into a bin placed under harvester machine 2302 by bin conveyor 2304. Harvester machine 2302 may include a grouping mechanism, such as a physical or air grouper, to group the crops at a grow site 53 away from the face plates 101 of the grow towers 50 in order to facilitate the harvesting process. Bin conveyor 2304 may be a u-shaped conveyor that transports empty bins the harvester station 34 and filled bins from harvester station 32. In one implementation, a bin can be sized to carry at least one load of crop harvested from a single grow tower 50. In such an implementation, a new bin is moved in place for each grow tower that is harvested. In one implementation, grow towers 50 enter the harvester machine 2302 full of mature plants and leave the harvester machine 2302 with remaining stalks and soil plugs to be sent to the next processing station.

Figure 23B:
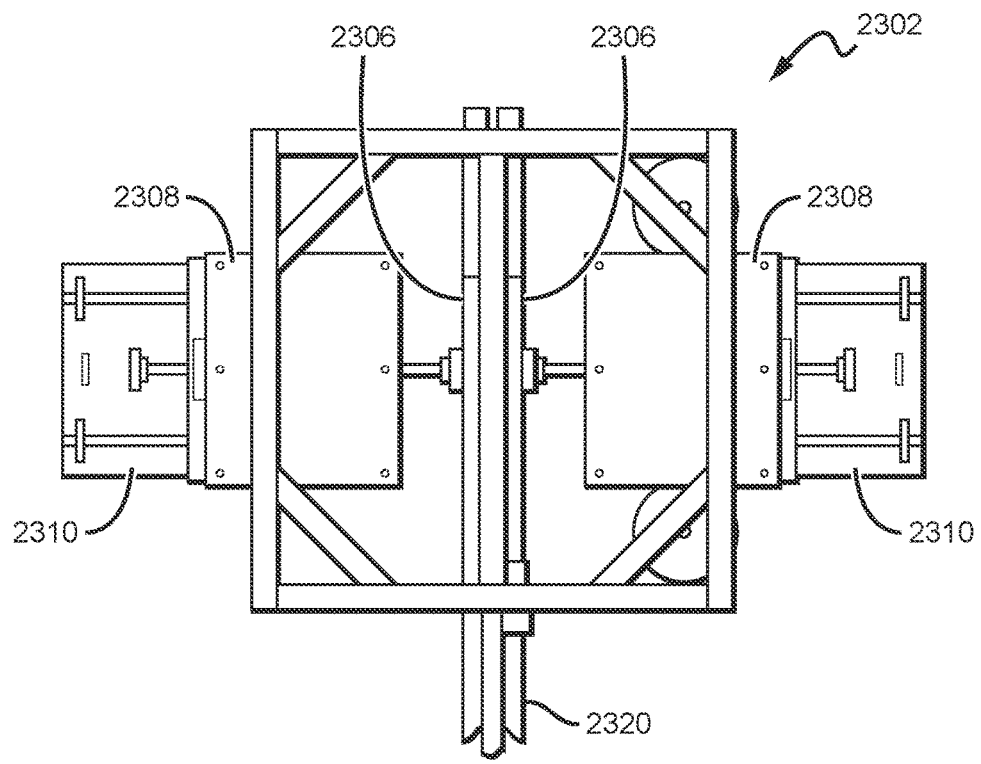
FIG. 23B is a top view of an example harvester machine.
Figure 23C:
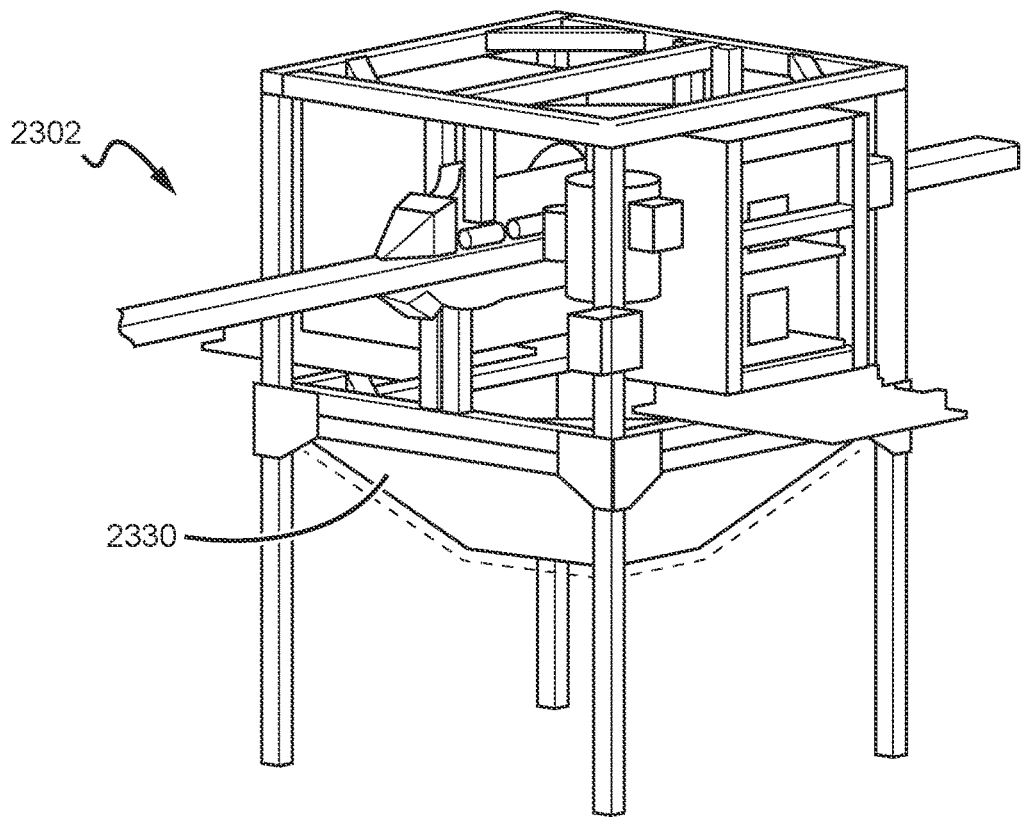
FIG. 23C is a perspective view of an example harvester machine.

FIG. 23B is a top view of an example harvester machine 2302. Circular blades 2306 extending from a rotary drive system 2308 harvest plants on opposing faces 101a of grow towers 50. In one implementation, rotary drive system 2308 is mounted to a linear drive system 2310 to move the circular blades 2306 closer to and farther away from the opposing faces 101a of the grow towers 50 to optimize cut height for different types of plants. In one implementation, each rotary drive system 2308 has an upper circular blade and a lower circular blade (and associated motors) that intersect at the central axis of the grow sites of the grow towers 50. Harvester machine 2302 may also include an alignment track 2320 that includes a set of rollers that engage groove 58 of the grow tower 50 as it is fed through the machine. Harvester machine 2302 may also include a tower drive system that feeds grow towers through the machine at a constant rate. In one implementation, the tower drive system includes a two drive wheel and motor assemblies located at opposite ends of harvester machine 2302. Each drive wheel and motor assembly may include a friction drive roller on the bottom and a pneumatically actuated alignment wheel on the top. As FIG. 23C illustrates, harvester machine 2302 may also include a gathering chute 2330 that collects harvested crops cut by blades 2306 as it falls and guides it into bins located under the machine 2302.

Washing station 34 may employ a variety of mechanisms to clean crop debris (such as roots and base or stem structures) from grow towers 50. To clean a grow tower 50, washing station 34 may employ pressurized water systems, pressurized air systems, mechanical means (such as scrubbers, scrub wheels, scrapers, etc.), or any combination of the foregoing systems. In implementations that use hinged grow towers (such as those discussed above), the washing station 34 may include a plurality of substations including a substation to open the front faces 101 of grow towers 50 prior to one or more cleaning operations, and a second substation to close the front faces 101 of grow towers after one or more cleaning operations. U.S. application Ser. No. 16/376,878 filed on Apr. 5, 2019, which is incorporated by reference herein for all purposes, discloses a substation for opening a hinged grow tower for washing or other operations. U.S. application Ser. No. 16/397,142 filed on Apr. 29, 2019, which is incorporated by reference herein for all purposes, discloses a substation for closing a hinged grow tower for transplanting or other operations. U.S. application Ser. No. 16/406,536 filed on May 8, 2019, which is incorporated by reference herein for all purposes, discloses a substation for cleaning a grow tower 50.

Figure 24A:
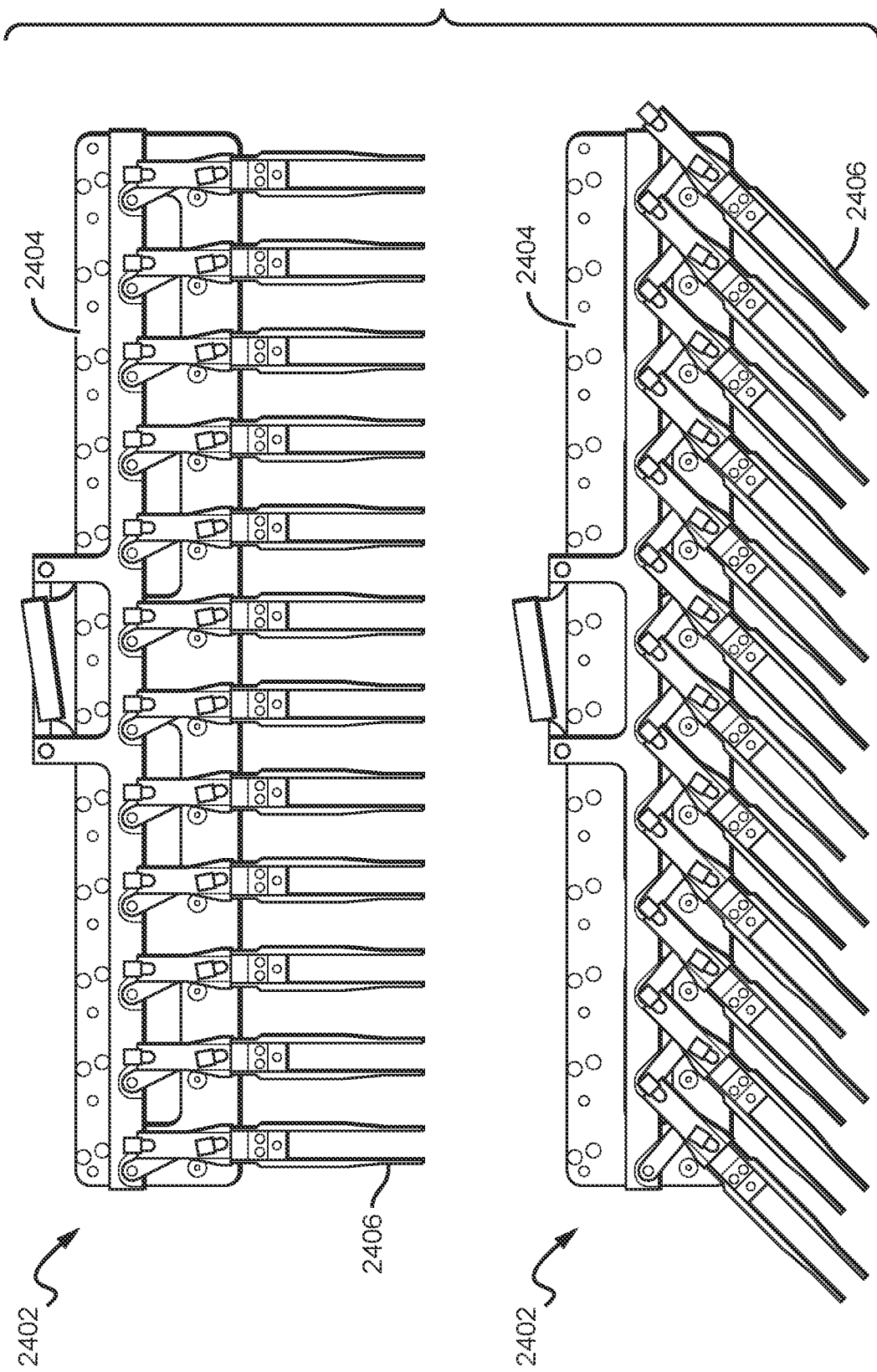
FIG. 24A is an elevation view of an example end effector for use in a transplanter station.
Figure 24B:
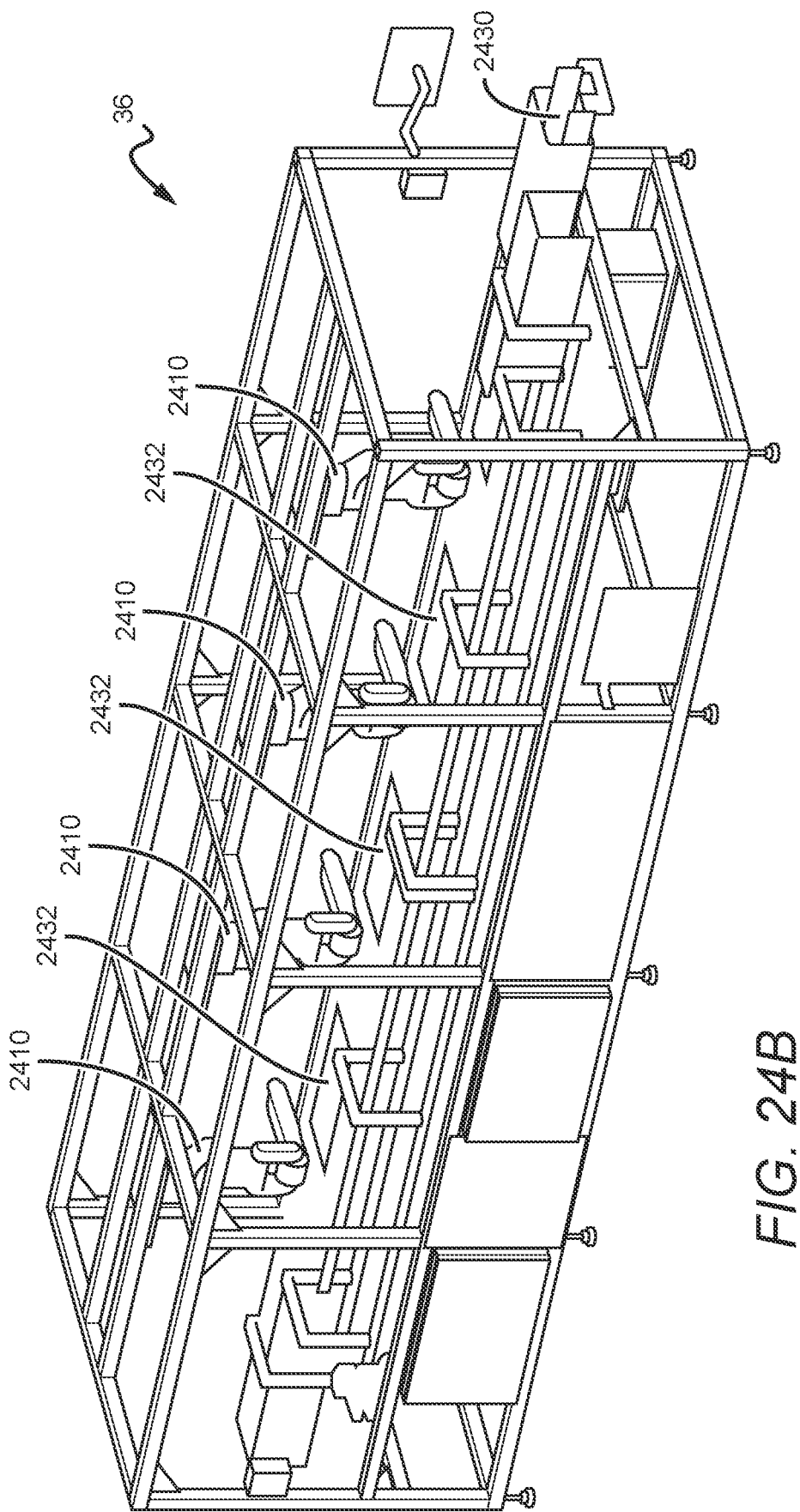
FIG. 24B is a perspective view of a transplanter station.

Transplanter station 36, in one implementation, includes an automated mechanism to inject seedlings into grow sites 53 of grow towers 50. In one implementation, the transplanter station 36 receives plug trays containing seedlings to be transplanted into the grow sites 53. In one implementation, transplanter station 36 includes a robotic arm and an end effector that includes one or more gripper or picking heads that grasps root-bound plugs from a plug tray and inserts them into grow sites 53 of grow tower 53. For implementations where grow sites 53 extend along a single face of a grow tower, the grow tower may be oriented such that the single face faces upwardly. For implementations where grow sites 53 extend along opposing faces of a grow tower 50, the grow tower 50 may be oriented such that the opposing faces having the grow sites face laterally. FIGS. 24A and 24B illustrate an example transplanter station. Transplanter station 36 may include a plug tray conveyor 2430 that positions plug trays 2432 in the working envelope of a robotic arm 2410. Transplanter station 36 may also include a feed mechanism that loads a grow tower 50 into place for transplanting. Transplanter station 36 may include one or more robotic arms 2410 (such as a six-axis robotic arm), each having an end effector 2402 that is adapted to grasp a root-bound plug from a plug tray and inject the root bound plug into a grow site 53 of a grow tower. FIG. 24A illustrates an example end effector 2402 that includes a base 2404 and multiple picking heads 2406 extending from the base 2404. The picking heads 2406 are each pivotable from a first position to a second position. In a first position (top illustration of FIG. 24A), a picking head 2406 extends perpendicularly relative to the base. In the second position shown in FIG. 24A, each picking head 2406 extends at a 45-degree angle relative to the base 2404. The 45-degree angle may be useful for injecting plugs into the plug containers 158 of grow towers that, as discussed above, extend at a 45-degree angle. A pneumatic system may control the pivoting of the picking heads between the first position and the second position. In operation, the picking heads 2406 may be in the first position when picking up root-bound plugs from a plug tray, and then may be moved to the second position prior to insertion of the plugs into plug containers 158. In such an insertion operation, the robotic arm 2410 can be programmed to insert in a direction of motion parallel with the orientation of the plug container 158. Using the end effector illustrated in FIG. 24A, multiple plug containers 158 may be filled in a single operation. In addition, the robotic arm 2410 may be configured to perform the same operation at other regions on one or both sides of a grow tower 50. As FIG. 24B shows, in one implementation, several robotic assemblies, each having an end effector 2402 are used to lower processing time. After all grow sites 53 are filled, the grow tower 50 is ultimately conveyed to automated pickup station 43, as described herein.

Figure 21B:
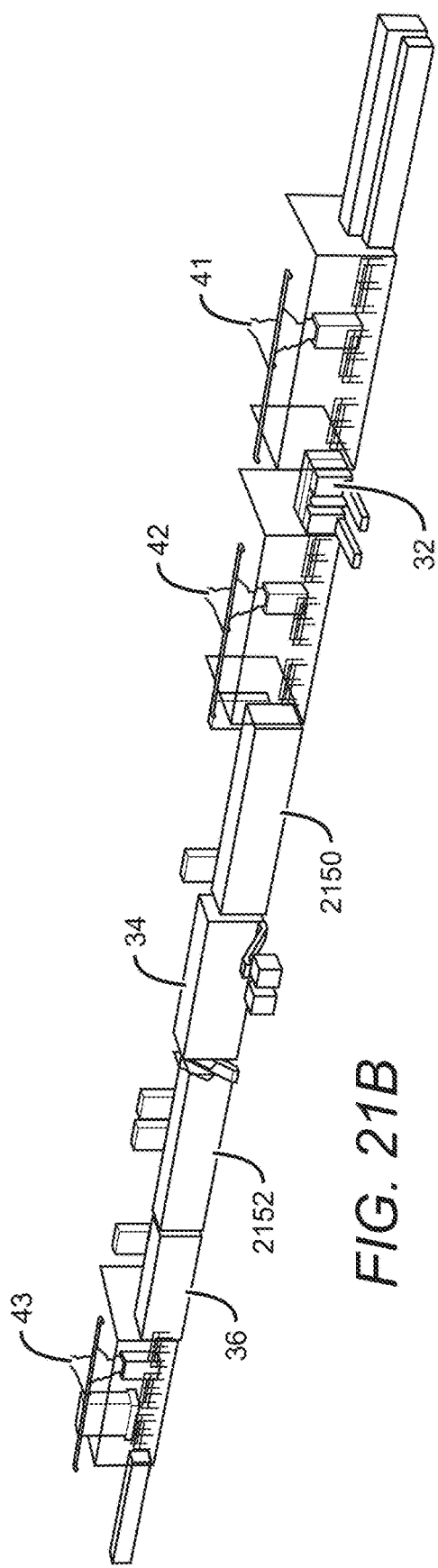
FIG. 21B is a perspective view of a central processing system according to an alternative implementation of the invention.
Figure 21C:
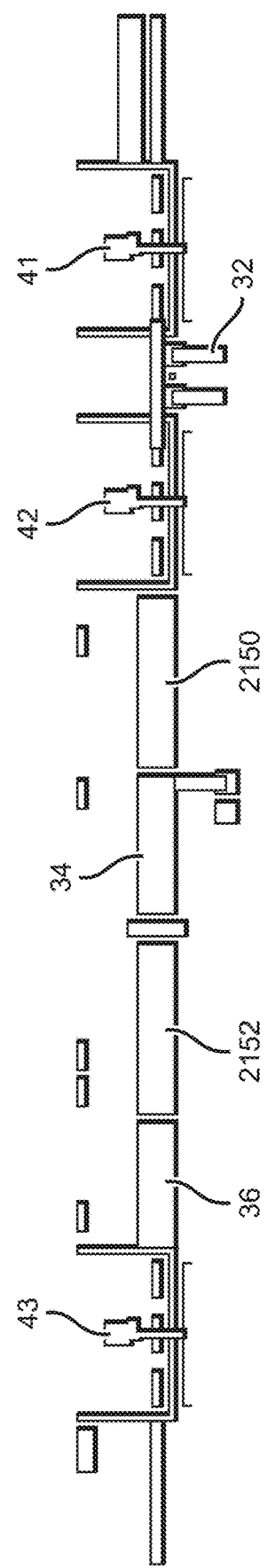
FIG. 21C is a top view of the alternative central processing system depicted in FIG. 21B.

FIGS. 21B and 21C illustrate an alternative configuration for central processing system 30. Central processing system 30 may additionally include one or more horizontal tower buffers 2150, 2152 to accommodate for differences in processing speed among the stations of central processing system 30 and/or to achieve other goals or efficiencies. In the implementation shown, central processing system 30 may include a first horizontal tower buffer 2150 disposed between harvesting station 32 and washing station 34, and a second horizontal tower buffer 2152 disposed between washing station 34 and transplanter station 36.

The stations of central processing system 30 may have different processing speeds that may require some form of accommodation. For example, assume that harvester station 32 has a grow tower processing through-put rate of X towers per minute, and that washing station 34 (with more operations to perform on each grow tower 50) may have a throughput-put rate of X/2. Horizontal tower buffer 2150 operationally decouples the cycle time of harvester station 32 from the cycle time of washing station 34. In other words, horizontal tower buffer 2150 functions to decouple the outfeed of harvester station 32 from the infeed of cleaning station 34, ensuring an open location into which the harvester station 32 can eject a processed grow tower 50 and ensuring the presence of a grow tower 50 for processing by washing station 34. Similarly, horizontal tower buffer 2152 functions to decouple the outfeed of washing station 34 from the infeed of transplanter station 36, allowing (for example) transplanter station 36 to incrementally process a grow tower 50 and the washing station 34 to process grow towers 50 without considering the state of processing of transplanter station 36.

Use of horizontal tower buffers 2150 and/or 2152 in central processing system 30 allows each individual station (each with its own processing time) to begin working on grow towers 50 as needed in order to complete processing of a target number of towers within an overall time envelope. For example, if the processing shift is 8 hours, transplanter station 36 (if it is the slowest station) could begin operating before other machines in the shift, with the other stations starting as needed to process within the overall time envelope of the processing session a target number of towers. In addition, tower buffers allow for the impact of planned and unplanned downtime events (e.g., maintenance, cleaning, station failure, etc.) for certain machines or stations to be masked relative to other stations.

Figure 21F:
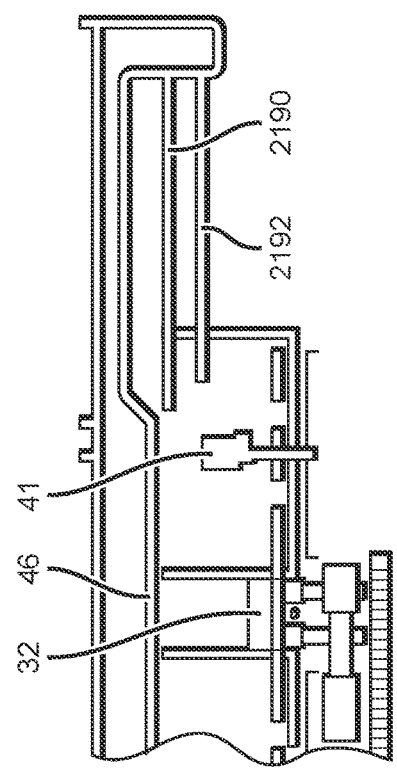
FIG. 21F is a sectional diagram illustrating an example pre-harvest buffering system.
Figure 21D:
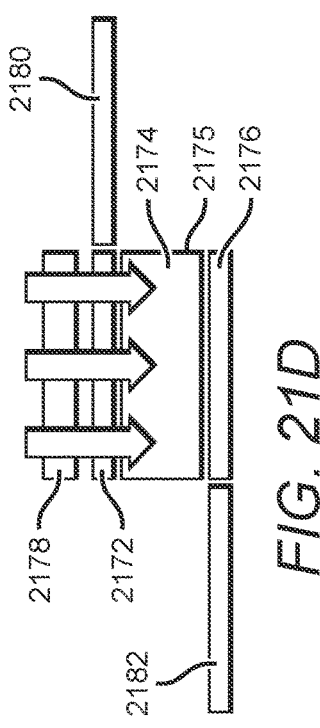
FIG. 21D is an example horizontal tower buffer.

FIG. 21D illustrates an example horizontal tower buffer 2150. In one implementation, horizontal tower buffer 2150 comprises an infeed conveyor 2178, a pusher mechanism 2178, a buffer space 2174, and an outfeed conveyor 2174. The infeed conveyor 2172 and outfeed conveyor 2176 may be belt or roller conveyors adapted to convey grow towers 50 laying horizontally thereon. Infeed conveyor 2172 is positioned to be in substantial alignment with the outfeed conveyance 2180 of the prior station—in this example, harvester station 32. Outfeed conveyor 2176 is positioned to be in substantial alignment with the infeed conveyance 2182 of the next station—in this example, transplanter station 36.

In one implementation, a control system causes infeed conveyor 2172 to load a grow tower 50 into position adjacent to buffer space 2174. Pusher mechanism 2178 pushes the grow tower 50 from infeed conveyor 2172 onto buffer space 2174. In one implementation, buffer space 2174 may be a flat surface with guide rails 2175 at opposing lateral edges to contain grow towers 50. In other implementations, the buffer space 2174 may further include passive or active mechanisms to facilitate transport of grow towers 50 from infeed conveyor 2172 to outfeed conveyor 2176. For example, buffer space 2174 may include an actuator that pushes or pulls an array of accumulated grow towers across a low-friction table or other surface. In addition, the buffer space 2174 may include a conveyor with cleats to isolate individual grow towers 50. In another implementation, buffer space 2174 may include a conveyor without cleats that accumulates grow towers 50 against a hard stop. In another implementation, the buffer space 2174 may include a table with physical features to discretize tower locations and a gripper and overhead gantry assembly to grip and move grow towers.

In one implementation, buffer space 2174 includes enough space for a predetermined number of grow towers (e.g., 5-10 or more grow towers). In operation, pusher mechanism 2178 can operate to push a grow tower 50 a given distance along the path from infeed conveyor 2172 to a first position on buffer space 2174. When pusher mechanism 2178 operates on a subsequent, second grow tower 50, the prior grow tower contacts the second grow tower 50 and is pushed to a second position in buffer space. Similarly, a grow tower 50 in the last position may then be pushed onto outfeed conveyor 2176. Alternatively, horizontal tower buffer 2150 may optionally include a puller or other mechanism for transferring grow towers from the last position of buffer space 2174 to the outfeed conveyor 2176.

The configuration of tower buffer 2152 is substantially the same as tower buffer 2150. In the implementation shown, the infeed conveyor of tower buffer 2152 is positioned to be aligned with the outfeed conveyor of washing station 34. The outfeed conveyor of tower buffer 2152 is positioned for alignment with infeed conveyance of transplanter station 36. Other implementations are possible. For example, buffer space 2174 may be augmented to provide more grow tower positions for the same distance between infeed conveyor 2172 and outfeed conveyor 2176. For example, buffer space 2174 may comprise a carrousel including a plurality of grow tower locations (e.g., 40 locations) that indexes by one with each cycle. In one implementation, position 1 of the carrousel corresponds to the infeed location, while position 40 (or other last position) corresponds to the outfeed position. The carrousel, in operation, would rotatably index across all positions before exiting the buffer space 2174. In another implementation, the buffer space 2174 may include a rack that provides storage for an array of grow towers 50 and an actuator (or robot) on a 1-axis or 2-axis gantry that moves towers in and out of rack locations. Still further, the buffer may be a "first-in-first-out" buffer or a "first-in-last-out" buffer. For example, the buffer space 2174 may comprise a vertical stack of grow towers 50 and an actuator to perform last-in-first-out buffering operations.

Figure 21E:
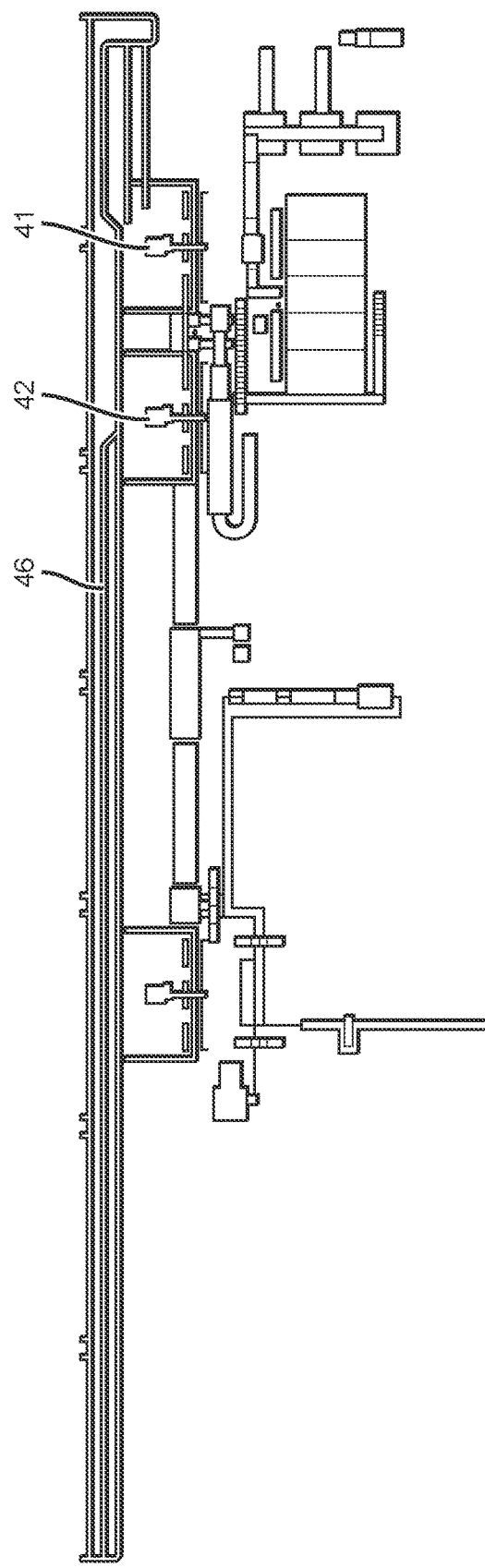
FIG. 21E is a schematic diagram illustrating an example configuration of a vertical tower conveyance system with the central processing system.

Still further, FIGS. 21E and 21F illustrate an alternative vertical tower conveyance system 46 that conveys towers into and out of growth environment 20. In the implementation shown, the vertical tower conveyance system 46 includes a track system that routes carriages 1202 to various destinations along the system 10. As FIG. 21F illustrates, the track system may include a first pre-harvest (cut-again) vertical buffer 2190 and a second pre-harvest (final-cut) vertical buffer 2192. As discussed above, central processing system may be configured to selectively process certain grow towers 50 for so-called cut-again processing. FIG. 21E illustrates that the system 10 may also include a second automated pickup station 42. In particular, after processing by harvester station 32, automated pickup station 42 may pick up a grow tower 50 from the outfeed conveyor of harvester station 32 rotate the grow tower 50 to vertical and place it on a carriage 1202 of tower conveyance mechanism 46 for reinsertion into a grow line 202. A grow tower 50 that undergoes "final-cut" processing is routed to washing station 34 and transplanter station 36 as described herein.

Towers designated as cut-agains take less time to process than towers 50 designated as final cuts, as cut-again towers need not pass through cleaning station 34 and transplanter station 36. Pre-harvest buffers 2190, 2192 provide a space to buffer grow towers prior to initiating harvester station 32 in order to ensure an adequate supply of grow towers 50 for efficient processing. A controller selectively routes grow towers 50, as appropriate, to either the cut-again buffer 2190 or final cut buffer 2192. Automated laydown station 41 can selectively access grow towers 50 from either buffer 2190 or 2192 under control of a control system as may be required. The use of separate vertical tower buffers allows the farm system 10 to alternate between cut-again and final-cut towers and maintain a consistent mix of final-cut and cut-again grow towers 50 for processing, despite such types of grow towers arriving in batches from growth environment. The use of separate buffers also allows system 10 to accommodate for the different cycle times of the cut-again and final-cut towers, increasing the total number of towers than can be processed within a given time span and improving the average cycle time of overall tower processing. In one implementation, automated laydown station 41 can alternate 1:1 between final-cut and cut-again pre-harvest buffers 2190, 2192 provided that both tower types are available. In other implementations, however, differences in cycle times between such tower types may suggest a ratio of 2 cut-again towers for every 1 final-cut tower. Other implementations are possible. For example, the system 10 may also include a vertical reject buffer (not shown) to provide a space to temporarily store grow towers that have failed a quality inspection. The reject buffer allows a rejected tower to simply be routed out of the processing pathway and stored for later handling.

Figure 25:
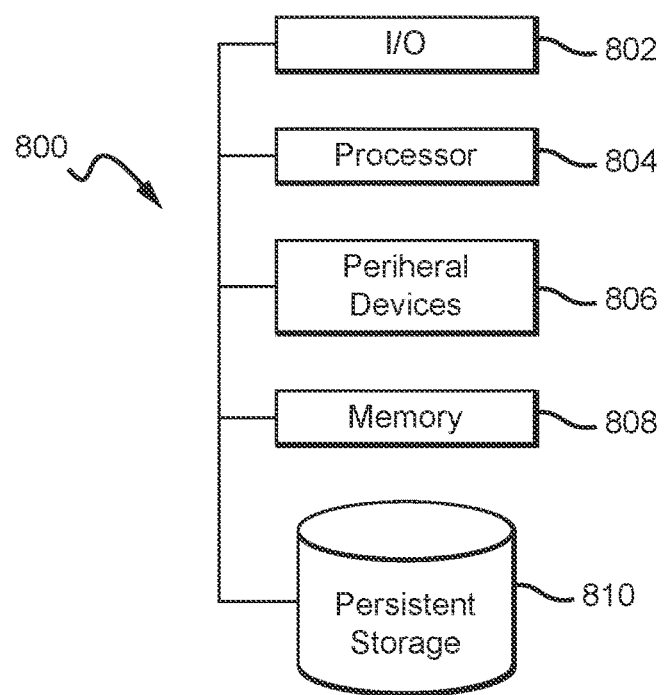
FIG. 25 illustrates an example of a computer system that may be used to execute instructions stored in a non-transitory computer readable medium (e.g., memory) in accordance with embodiments of the disclosure.

One or more of the controllers discussed above, such as the one or more controllers for central processing system 30, may be implemented as follows. FIG. 25 illustrates an example of a computer system 800 that may be used to execute program code stored in a non-transitory computer readable medium (e.g., memory) in accordance with embodiments of the disclosure. The computer system includes an input/output subsystem 802, which may be used to interface with human users or other computer systems depending upon the application. The I/O subsystem 802 may include, e.g., a keyboard, mouse, graphical user interface, touchscreen, or other interfaces for input, and, e.g., a LED or other flat screen display, or other interfaces for output, including application program interfaces (APIs). Other elements of embodiments of the disclosure, such as the controller, may be implemented with a computer system like that of computer system 800.

Program code may be stored in non-transitory media such as persistent storage in secondary memory 810 or main memory 808 or both. Main memory 808 may include volatile memory such as random-access memory (RAM) or non-volatile memory such as read only memory (ROM), as well as different levels of cache memory for faster access to instructions and data. Secondary memory may include persistent storage such as solid-state drives, hard disk drives or optical disks. One or more processors 804 reads program code from one or more non-transitory media and executes the code to enable the computer system to accomplish the methods performed by the embodiments herein. Those skilled in the art will understand that the processor(s) may ingest source code, and interpret or compile the source code into machine code that is understandable at the hardware gate level of the processor(s) 804. The processor(s) 804 may include graphics processing units (GPUs) for handling computationally intensive tasks.

The processor(s) 804 may communicate with external networks via one or more communications interfaces 807, such as a network interface card, WiFi transceiver, etc. A bus 805 communicatively couples the I/O subsystem 802, the processor(s) 804, peripheral devices 806, communications interfaces 807, memory 808, and persistent storage 810. Embodiments of the disclosure are not limited to this representative architecture. Alternative embodiments may employ different arrangements and types of components, e.g., separate buses for input-output components and memory subsystems.

Facility Layout & Arrangement

Figure 26:
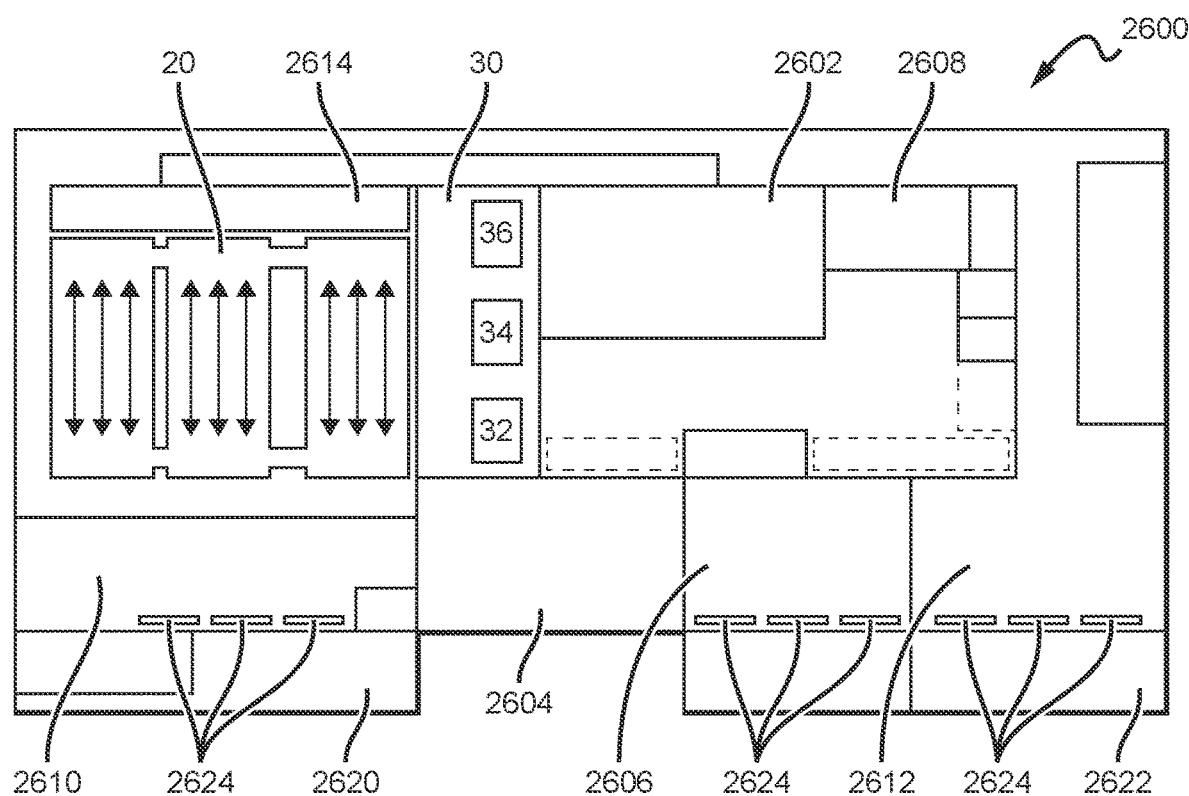
FIG. 26 is a functional block diagram illustrating an example crop production facility layout.

FIG. 26 is a functional block diagram illustrating an example controlled-environment agriculture production facility 2600. As FIG. 26 illustrates, production facility 2600 includes growth environment 20, central processing system 30, propagation space 2602, post-harvest processing space 2604, and cold storage space 2606. Production facility also includes seeding space 2608, receiving space 2610, receiving space 2612, and aqueous nutrient supply system 2614. One or more space or area components of production facility 2600 may be housed within a warehouse building or any other suitable building structure. For example, receiving spaces 2610 and 2612 may not be subject to environmental controls and have be subject to ambient temperature and air conditions. In other implementations, receiving spaces 2610 and 2612 are contained in a controlled environment.

As discussed above, growth environment 20 may be a substantially-encapsulated space to facilitate control of one or more environmental conditions to which crops are exposed and to reduce risk of potential contaminants and pests. As FIGS. 1 and 2 illustrate, central processing system 30 is adjacent to growth environment 20. In the implementations shown, harvesting station 32, washing station 34 and transplanter station 36 are arranged in a substantially linear orientation parallel to the direction of travel of the grow lines 202. As FIG. 26 illustrates, grow lines 202 may be arranged in a substantially parallel orientation. Adding grow line capacity can be accomplished by adding grow lines 202 to the end of growth environment 20 that is opposite central processing system 30. In some implementations, growth environment 20 may comprise separate modules, each encapsulating one or more grow lines 202. Aqueous nutrient supply system 2614 includes one or more fluid tanks, nutrient supply and mixing equipment, fluid pumps, manifolds, plumbing and related equipment to provide aqueous nutrients to grow lines 202 as discussed above. The plumbing (not shown) delivering nutrient solution from aqueous nutrient supply system 2614 can extend over growth environment 20 and/or grow lines 202. Furthermore, HVAC systems, such as chillers, air handlers and other equipment bay be housed between sections of growth environment 20 and/or placed on the top of the structure that contains the facility 2600.

Implementations of production facility 2600 are arranged to optimize efficiency. In some implementations, production facility 2602 may be configured to reduce or minimize total product flow distance from seed stage to post-harvest processing and cold storage. Minimizing or reducing this metric increases cost efficiencies by, for example, reducing the total length of conveyors used in the facility. The layout of production facility 2602 may also be configured to reduce or minimize other attributes, such as the percentage of unutilized space, the distance of employee travel, the maximum distance between any two stations in the facility 2600, length of cabling, plumbing and/or HVAC ducting, and total wall length.

Propagation space 2602 includes equipment for growing young plants in stacked horizontal beds (or plug trays) for later transplant into grow towers 50. Propagation space 2602 may include a rack system for vertically stacking the horizontal beds or plug trays. In one implementation, propagation space 2602 is a substantially encapsulated growth environment that includes air handling, lighting, climate control, irrigation and other equipment to grow plants from seed stage to transplant stage. The grow lights used in propagation space 2602 may be air-cooled and located above each horizontal bed. In one embodiment, plants are initially grown in so-called plug-trays, where each tray include multiple plugs that are ultimately transferred to transplanter station 36 when ready. As FIG. 26 demonstrates, propagation space 2602 is located adjacent to central processing system and proximal to transplanter station 36. Such a configuration minimizes the distance plug trays are required to travel from propagation space 2602 to transplanter station 36. In one implementation, a conveyor may transfer loaded plug trays from propagation area 2602 to transplanter station 36. Seeding area 2608 is a space including one or more stations and associated equipment for filling plug trays with growth medium, seeds, and other nutrient or water solutions to meet the nutritional requirements for ideal growth per variety. In the implementation shown, seeding area 2608 is adjacent to propagation space 2602. In addition to a seeding line, the seeding space 2608 may also include media/soil storage, storage for seeds in a controlled temperature environment (e.g., a refrigerator) depending on requirements, and potentially media/soil mixing equipment. Seeding area 2608 may also include ventilation equipment.

Post-harvest processing space 2604 may be an encapsulated environment that includes equipment for processing crops after they have been harvested from grow towers 50 at harvester station 32. In some implementations, post-harvest processing space 2604 is a substantially encapsulated space subject to controlled environmental conditions; for example, post-harvesting space 2604 may be a cooled or refrigerated environment, or a warmed environment to accommodate other types of crops. In some implementations, the equipment included in post-harvest processing space 2604 may include crop washing and drying equipment, product quality equipment, product cooling equipment, product packaging equipment, and food safety equipment. Other equipment may include process isolation equipment for sanitation purposes. Post-harvest processing space 2604 is arranged adjacent to central processing system 30 and proximal to harvester station 32 to minimize or reduce the distance that harvested crop travels from harvester station 32. In one implementation, bin conveyor 2304 can extend directly into post-harvest processing space 2604 to convey bins loaded with harvested crop into the space. In one implementation, harvested product can be harvested directly onto conveyance without bins, and transported to the post-harvest processing space 2604. In addition, harvested product (whether in bins or conveyed directly on a conveyor) may also be subject to cooling systems (such as vacuum cooling, a cooling tunnel, etc.) as it is conveyed to post-harvest processing space 2604. Similarly, cold storage space 2606 is a controlled, refrigerated environment adapted for storing packaged crops for shipment depending on the specific crop storage environmental requirements. In some implementations, the equipment included in cold storage space 2606 may include package palletizing equipment, case erecting equipment, and other inventory storage equipment or infrastructure. In the implementation shown, cold storage space 2606 is adjacent to post-harvest processing space 2604.

Receiving space 2610 and receiving space 2612 are areas of facility 2600 adapted for receiving supplies. Additionally, receiving spaces 2610 and 2612 may house any additional electrical or mechanical equipment that does not need to be installed within the clean or controlled environment of the production facility. In one implementation, spaces 2610 and 2610 are connected to loading bays 2620, 2622 including one or more dock doors 2624 for receiving supplies shipped by truck. Receiving space 2612 may be located more proximally to propagation space 2602 and seeding space 2608 in order to reduce the distance traveled for seeds, soil and other supplies consumed by such spaces. Similarly, receiving space 2610 may be located more proximally to post-harvest processing space 2604 and/or central processing system 30 to receive supplies consumed in such areas. Similarly, cold storage space 2606 may include dock doors 2624 allowing for flow of product out of loading bay 2622.

As FIG. 26 illustrates, total product flow from seed to packaging is both direct and efficient, reducing operating time, operating cost and capital expenditure. In particular, the product flow starts at seed station 2608 where plug trays are filled with soil and seeded. The product flow proceeds to the propagation space 2602 where plants germinate and are ready for transplant. The plug trays are then conveyed to transplant station 36 of central processing system 30, where the plugs are inserted in crop-bearing modules, such as the plug containers of grow towers 50. The grow towers 50 are inserted into growth environment 20 where they proceed from one end to another of the space along grow lines 202. Grow towers 50 are then transferred to harvesting station 32 where the crop is harvested and conveyed to post-harvest processing space 2604. The packaged product is ultimately stored in cold storage facility 2606 from where it may be ultimately shipped out of the facility 2600 from loading bay 2622 via dock doors 2624.

Figure 27:
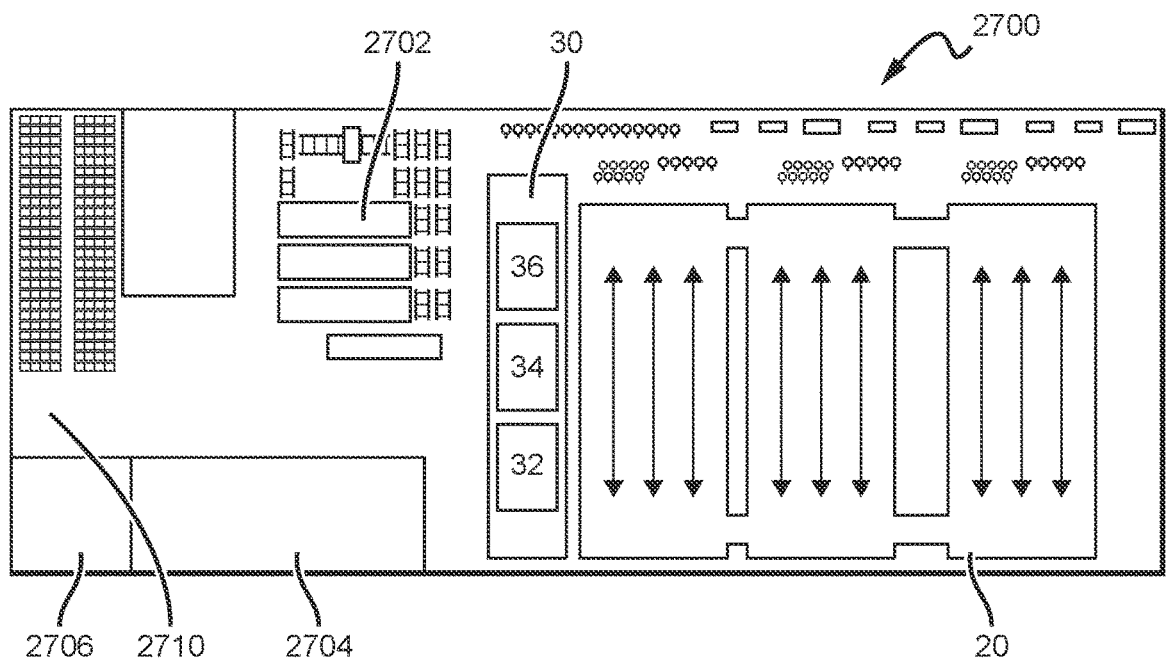
FIG. 27 is a functional block diagram illustrating another example crop production facility layout.

FIG. 27 illustrates an alternative layout for a production facility 2700. In this implementation, propagation area 2702 is not enclosed by walls; however, the propagation racking that houses plug trays is encapsulated or sealed off. Production facility 2700 includes a single receiving space 2710 located substantially proximal to both propagation area 2702 and post-harvest processing space 2704. In one implementation, loading bays can extend from receiving area 2710 and cold storage space 2706 to facilitate loading and unloading from trucks. Otherwise, production facility 2700 is substantially the same as production facility 2600.

Figure 28:
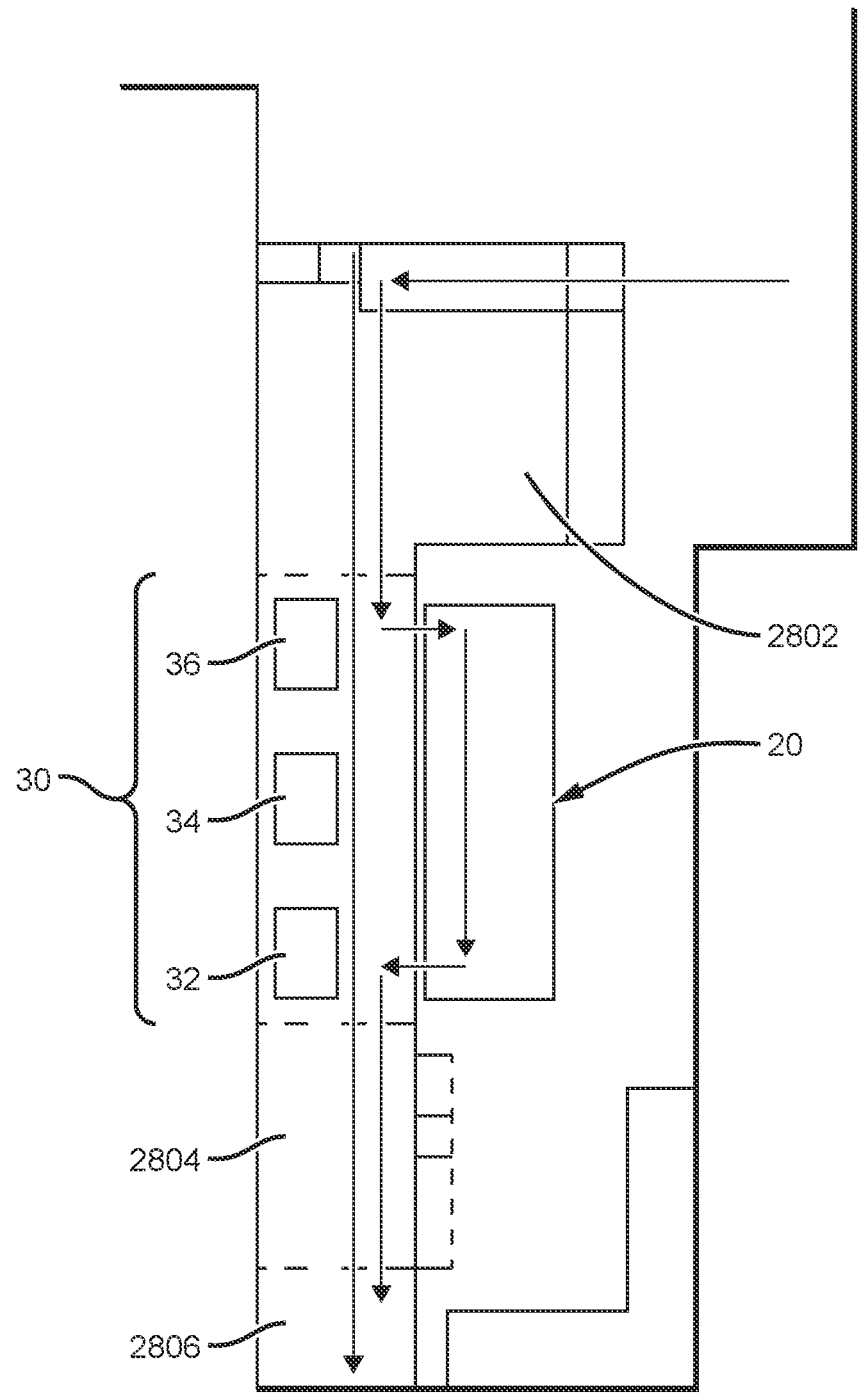
FIG. 28 is a functional block diagram illustrating yet another example crop production facility layout.

FIG. 28 illustrates an alternative layout for a production facility 2800. In the layouts depicted in FIGS. 26 and 27, the overall product flow resembles a u-shape. The layout depicted in FIG. 28 has a more linear product flow. In the layout illustrated in FIG. 28, propagation area 2802 is located in an alternative location relative to the layout depicted in FIG. 26 or FIG. 27 in that it is located at the end of processing system 30 and growth environment 20. Furthermore, post-harvest processing space 2804 and cold storage area 2806 are arranged substantially in line with the stations of central processing system 30. Otherwise, production facility 2800 is substantially the same as production facility 2600.

Figure 29:
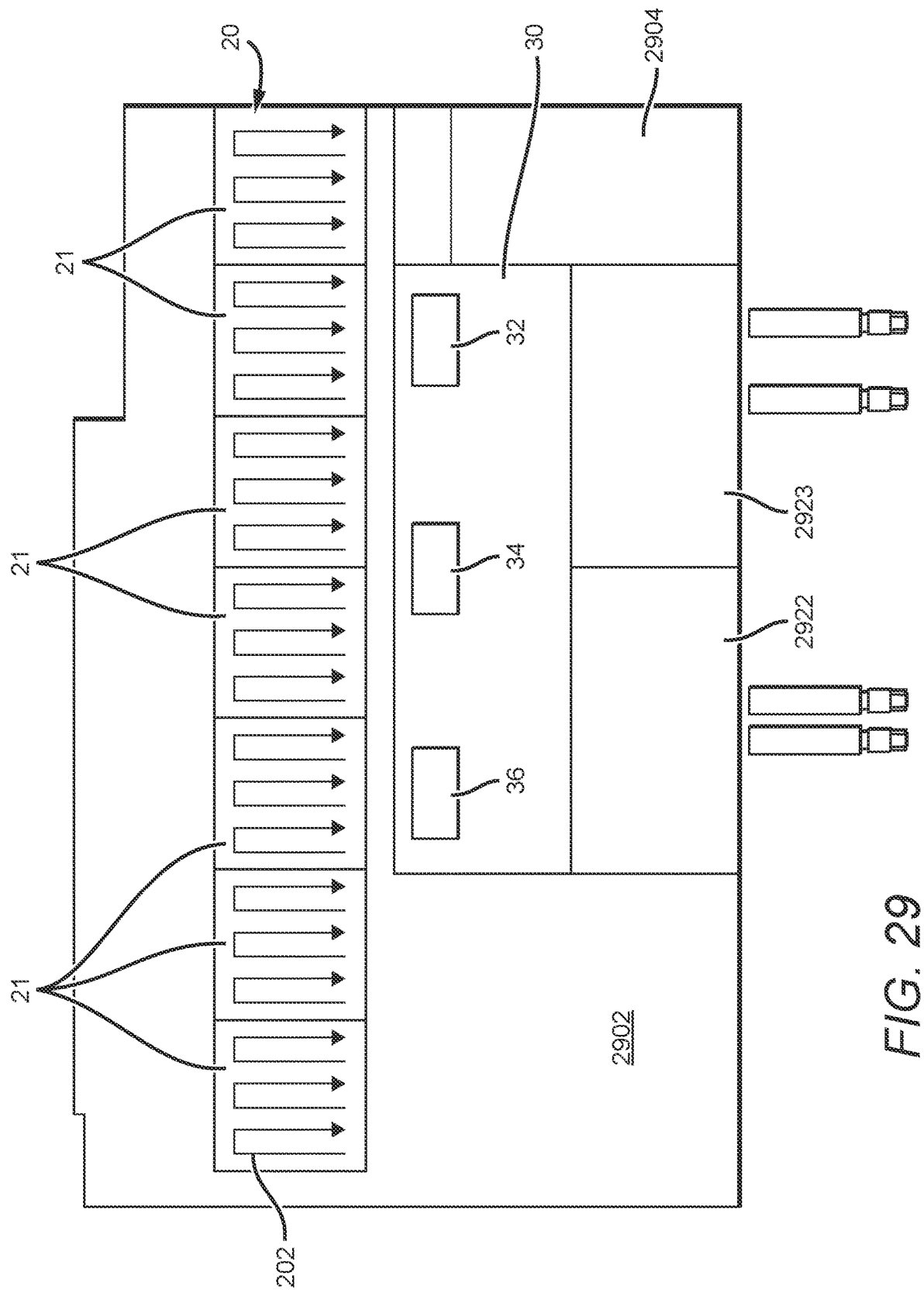
FIG. 29 is a functional block diagram illustrating yet another example crop production facility layout.

FIG. 29 illustrates another alternative layout for a production facility. Overall, the layout illustrates in FIG. 29 is somewhat similar in configuration to the layout of FIG. 27. In FIG. 29, however, the facility includes an inbound loading bay 2922 to receive supplies and other inventory for use by the facility and an outbound loading bay 2923 to facilitate shipping out crops produced in the facility. As shown, inbound and outbound loading bays 2922, 2923 are disposed adjacently to central processing system 30 and between propagation area 2902 and post-harvest processing space 2804. Still further, growth environment 20 may be separated into multiple sub-sections 21, where the grow lines 202 run substantially perpendicular to the flow of stations 32, 34 and 36 in central processing system 30. Each of the growth environments 21 may be separately controlled to support optimized growing for a variety of different crop types. In the implementation shown, a vertical tower transfer conveyance mechanism may be configured to include track sections that loop into each growth environment 21. A control system can cause the transfer conveyance mechanism to route carriages 1202 to select grow lines 202 within a select growth environment 21. Still further, in each growth environment 21, the grow lines 202 may be u-shaped such that grow towers 50 are injected into and extracted from a grow line 202 at the same side or end (e.g., the side closest to central processing system 30) of the growth environment 21. In a particular implementation, u-shaped grow lines 202 have a first path section, a second path section and a return mechanism that transfers grow towers 50 from the end of the first path section to the beginning of the second path section.

Although the disclosure may not expressly disclose that some embodiments or features described herein may be combined with other embodiments or features described herein, this disclosure should be read to describe any such combinations that would be practicable by one of ordinary skill in the art. Unless otherwise indicated herein, the term "include" shall mean "include, without limitation," and the term "or" shall mean non-exclusive "or" in the manner of "and/or."

Those skilled in the art will recognize that, in some embodiments, some of the operations described herein may be performed by human implementation, or through a combination of automated and manual means. When an operation is not fully automated, appropriate components of embodiments of the disclosure may, for example, receive the results of human performance of the operations rather than generate results through its own operational capabilities.

All references, articles, publications, patents, patent publications, and patent applications cited herein are incorporated by reference in their entireties for all purposes to the extent they are not inconsistent with embodiments of the disclosure expressly described herein. However, mention of any reference, article, publication, patent, patent publication, and patent application cited herein is not, and should not be taken as an acknowledgment or any form of suggestion that they constitute valid prior art or form part of the common general knowledge in any country in the world, or that they are disclose essential matter.

Several features and aspects of the present invention have been illustrated and described in detail with reference to particular embodiments by way of example only, and not by way of limitation. For example, although certain embodiments discussed above are disclosed as operating in connection with vertical grow towers and vertical-to-horizontal interfacing systems, the present invention also contemplates systems where grow towers remain substantially vertical for various processing operations. In addition, other embodiments contemplate that the controlled growth environment houses horizontal troughs or trays where crops are grown in horizontal structures. Still further, the controlled growth environment may also contain vertical wall structures, such as those disclosed in US Patent Publication Nos. 2018/0014485 and 2018/0014486. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A crop production facility for controlled environment agriculture, comprising:
    a growth environment comprising a vertical grow tower conveyance system; wherein the vertical grow tower conveyance system comprises:
        one or more grow lines;
        a plurality of grow towers, each of the plurality of grow towers vertically attached to, and moveable along, a respective one of the one or more grow lines, wherein each of the plurality of grow towers includes a plurality of grow sites extending at least along one face thereof; and
        a grow tower conveyance mechanism operative to move the one or more grow towers along a respective grow line;
    a central processing system located adjacently to the growth environment, the central processing system comprising:
        a transplanter station arranged proximal to the first end of the growth environment;
        a harvester station arranged more proximally to the second end of the growth environment relative to the transplanter station; and
    wherein the harvester station comprises a crop harvesting machine, and a feeder mechanism to receive a grow tower in a horizontal orientation and feed the grow tower through the crop harvesting machine in a horizontal orientation; and
    wherein the crop production facility further comprises an automated laydown station comprising a first robot including an end effector adapted to releasably grasp a grow tower, and control logic operative to cause the first robot to pick the grow tower from a pick location in a vertical orientation, rotate the grow tower to a horizontal orientation and place the grow tower on a conveyor for loading into the harvester station.

2. The crop production facility of claim 1 wherein the end effector comprises a beam, a first gripper attached to a first end of the beam, and a second gripper attached to a second end of the beam, wherein the first and second grippers are configured to releasably grasp a grow tower.

3. The crop production facility of claim 1 wherein the first robot comprises a robotic arm movable in six axes.

4. The crop production facility of claim 1 wherein the growth environment is substantially encapsulated and comprises one or more control systems for controlling one or more environmental variables.

5. The crop production facility of claim 4 further comprising an unload transfer conveyor comprising a plurality of carriages disposed on a track; and wherein the unload transfer conveyor is configured to convey carriages carrying grow towers releasably attached thereto from the one or more grow lines in the controlled growth environment to a pick location reachable by the first robot of the automated laydown station.

6. The crop production facility of claim 5 further comprising a washing station; and a plurality of conveyors arranged to convey grow towers to and from respective ones of the harvester station, the washing station and the transplanter station, wherein the plurality of conveyors include a first conveyor arranged to feed a grow tower to the harvester station, a second conveyor arranged to feed a grow tower to the washing station, a third conveyor arranged to feed a grow tower to the transplanter station, and a fourth conveyor arranged to feed a grow tower from the transplanter station to a pickup location.

7. The crop production facility of claim 5 further comprising two or more pre-harvest buffers; and wherein the unload transfer conveyor is operative to selectively route grow towers to a select one of the two or more pre-harvest buffers for pick up by the automated laydown station.

8. The crop production facility of claim 1 wherein the central processing system further comprises a washing station comprising a second feeder mechanism to receive a grow tower in a horizontal orientation and feed the grow tower through the washing station in a horizontal orientation.

9. The crop production facility of claim 8 further comprising a horizontal tower buffer disposed between the harvester station and the washing station, the horizontal tower buffer configured to buffer a plurality of grow towers processed by the harvester station and to provide a buffered grow tower to the washing station to thereby operationally decouple the harvester station from the washing station.

10. The crop production facility of claim 8 further comprising a horizontal tower buffer disposed between the washing station and the transplanter station, the horizontal tower buffer configured to buffer a plurality of grow towers processed by the washing station and to provide a buffered grow tower to the transplanter station to thereby operationally decouple the washing station from the transplanter station.

11. The crop production facility of claim 1 further comprising
   a loading transfer conveyor comprising a plurality of carriages disposed on a track; and wherein the loading transfer conveyor is configured to convey carriages carrying grow towers releasably attached thereto from a stop location to the one or more grow lines; and
   an automated pickup station comprising a second robot including a second end effector adapted to releasably grasp a grow tower, and control logic operative to cause the second robot to grasp a grow tower from the pickup location in a horizontal orientation, rotate the grow tower to a vertical orientation and attach the grow tower to a carriage of the loading transfer conveyor at the stop location.

12. The crop production facility of claim 11 wherein the second end effector comprises a beam, a first gripper attached to a first end of the beam, and a second gripper attached to a second end of the beam, wherein the first and second grippers are configured to releasably grasp a grow tower.

13. The crop production facility of claim 1 further comprising a post-harvest processing facility located adjacent to the central processing system and proximal to the harvester station.

14. The crop production facility of claim 13 further comprising a seeding area adjacent to the propagation area.

15. The crop production facility of claim 14 further comprising a loading bay adjacent to the seeding area and proximal to the propagation area.

16. The crop production facility of claim 13 further comprising a cold storage facility adjacent to the post-harvest processing facility.

17. The crop production facility of claim 16 further comprising a conveyor configured to carry bins or harvested product directly on the belt from the harvester station to the post-harvest processing facility.

18. The crop production facility of claim 16 further comprising a loading bay adjacent to the cold storage facility.

19. The crop production facility of claim 1 further comprising a propagation area adjacent to the central processing system and adjacent to the transplanter station.

20. The crop production facility of claim 19 wherein the propagation area is a substantially enclosed space.

* * * * *